(12) United States Patent
Niederer et al.

(10) Patent No.: US 12,546,916 B2
(45) Date of Patent: Feb. 10, 2026

(54) ORIENTATION INDEPENDENT COMA COMPENSATING LIQUID LENS

(71) Applicant: OPTOTUNE AG, Dietikon (CH)

(72) Inventors: David Andreas Niederer, Küttigen (CH); Stephan Smolka, Zürich (CH)

( * ) Notice: Subject to any disclaimer, the term of this patent is extended or adjusted under 35 U.S.C. 154(b) by 1079 days.

(21) Appl. No.: 17/270,065

(22) PCT Filed: Aug. 22, 2019

(86) PCT No.: PCT/EP2019/072524
§ 371 (c)(1),
(2) Date: Feb. 22, 2021

(87) PCT Pub. No.: WO2020/039047
PCT Pub. Date: Feb. 27, 2020

(65) Prior Publication Data
US 2021/0325575 A1    Oct. 21, 2021

(30) Foreign Application Priority Data

Aug. 22, 2018 (EP) .................................. 18190314
Oct. 2, 2018 (EP) .................................. 18198367
(Continued)

(51) Int. Cl.
*G02B 3/14* (2006.01)
*G02C 7/08* (2006.01)

(52) U.S. Cl.
CPC ............. *G02B 3/14* (2013.01); *G02C 7/085* (2013.01); *G02C 2202/22* (2013.01)

(58) Field of Classification Search
CPC . G02B 3/12; G02B 3/14; G02C 7/081; G02C 7/085; G02C 2022/22
(Continued)

(56) References Cited

U.S. PATENT DOCUMENTS 4,958,919 A * 9/1990 Sigler ..................... G02B 1/06
359/665
7,643,217 B2 * 1/2010 Yokoyama ........... G02B 26/004
359/666
(Continued)

FOREIGN PATENT DOCUMENTS

EP    2860555        4/2015
EP    2860555 A1 *  4/2015 ........... G02B 26/004
(Continued)

OTHER PUBLICATIONS

Patrick R. Scheeper et al., The Design, Fabrication, and Testing of Corrugated Silicon Nitride Diaphragms, 3 Journal of Microelectromechanical Systems 36-42 (1994). (Year: 1994).*
(Continued)

*Primary Examiner* — James R Greece
(74) *Attorney, Agent, or Firm* — JMB Davis Ben-David

(57) ABSTRACT

The present invention relates to a lens (1), comprising: a first chamber (C1) filled with a first transparent liquid (L1) comprising a first mass density ($\rho_1$) and a first refractive index ($n_1$), a second chamber (C2) filled with a second transparent liquid (L2) comprising a second mass density ($\rho_2$) and a second refractive index ($n_2$), and a transparent and elastically deformable first membrane (12) that separates the two chambers (C1, C2) from one another and contacts the first liquid (L1) and the second liquid (L2), wherein said mass densities ($\rho_1$, $\rho_2$) and said refractive indices ($n_1$, $n_2$) are selected such that a gravity-induced coma aberration of the lens (1) is reduced or prevented.

28 Claims, 26 Drawing Sheets

(30) Foreign Application Priority Data

Mar. 14, 2019 (EP) .................................... 19162999
Jun. 25, 2019 (EP) .................................... 19182421

(58) Field of Classification Search
USPC ...................................................... 359/666
See application file for complete search history.

(56) References Cited

U.S. PATENT DOCUMENTS

| | | | | |
|---|---|---|---|---|
| 8,699,141 | B2* | 4/2014 | Aschwanden | G02B 7/10 |
| | | | | 359/666 |
| 8,780,450 | B2* | 7/2014 | Ono | G02B 3/14 |
| | | | | 359/666 |
| 8,947,784 | B2* | 2/2015 | Kern | B29D 11/00403 |
| | | | | 359/666 |
| 9,250,367 | B2* | 2/2016 | Costache | G02B 26/004 |
| 9,575,221 | B2* | 2/2017 | Nunnink | G02B 26/004 |
| 10,677,967 | B1* | 6/2020 | Ouderkirk | G02B 26/004 |
| 10,747,309 | B2* | 8/2020 | Akkaya | G06F 3/013 |
| 2009/0195882 | A1 | 8/2009 | Bolle et al. | |
| 2010/0208194 | A1 | 8/2010 | Gupta | |
| 2011/0149410 | A1* | 6/2011 | Blum | G02B 3/14 |
| | | | | 359/666 |
| 2016/0103253 | A1* | 4/2016 | Oku | G02B 3/14 |
| | | | | 359/666 |
| 2016/0363737 | A9* | 12/2016 | Aschwanden | G02B 26/0825 |
| 2017/0017019 | A1* | 1/2017 | Bolis | G02B 3/14 |
| 2018/0100954 | A1* | 4/2018 | Stevens | G02C 7/085 |
| 2020/0096770 | A1* | 3/2020 | Pedder | G02B 27/0176 |
| 2021/0116682 | A1* | 4/2021 | Smolka | G02B 13/12 |

FOREIGN PATENT DOCUMENTS

| | | | | |
|---|---|---|---|---|
| JP | 2007 518132 | | 7/2007 | |
| JP | 2007 538338 | | 12/2007 | |
| JP | 2011169970 | | 9/2011 | |
| KR | 20120034596 | | 4/2012 | |
| KR | 101180880 | | 9/2012 | |
| WO | 2006011937 | | 2/2006 | |
| WO | 2012010201 | | 1/2012 | |
| WO | WO-2013143630 | A1 * | 10/2013 | ............... G02B 3/14 |
| WO | 2014125262 | | 8/2014 | |
| WO | 2014181419 | | 11/2014 | |
| WO | 2017176898 | | 10/2017 | |
| WO | 2018028847 | | 2/2018 | |

OTHER PUBLICATIONS

Hossein Gholizadeh et al., Fluid Bulk Modulus: A Literature Survey, 12 International Journal of Fluid Power 5-15 (2011). (Year: 2011).*
L. Weiss et al., Water Density and Polarizability Deduced from the Refractive Index Determined by Interferometric Measurements Up to 250 MPa, 136 The Journal of Chemical Physics 124201-1 to 124201-8 (2012). (Year: 2012).*
Microscope Objectives: Achromat vs. Plan Achromat, 2012, pp. 1-2 [online], [retrieved Dec. 13, 2023], retrieved from the Internet <URL: https://blog.microscopeworld.com/2012/09/microscope-objectives-achromat-vs-plan.html>. (Year: 2012).*
Poly(dimethylsiloxane) Basic Information, 2016, pp. 1-2 [online], [retrieved Dec. 12, 2023], retrieved from the Internet <URL: http://web.archive.org/web/20160405195722/https://www.chemicalbook.com/ProductChemicalPropertiesCB3696473_EN.htm>. (Year: 2016).*
Particularly, 2017, pp. 1-17 [online], [retrieved Dec. 13, 2023], retrieved from the Internet <URL: http://web.archive.org/web/20170607031813/https://www.merriam-webster.com/dictionary/particularly>. (Year: 2017).*
Orientation Independent Coma Compensating Liquid Lens, 2019, pp. 1-53 [online], [retrieved Dec. 14, 2023], retrieved from the Internet (Year: 2019).*
Hui Min Leung et al., Liquid Tunable Double-focus Lens Fabricated with Diamond Cutting and Soft Lithography, 48 Applied Optics 5733-5740 (2009). (Year: 2009).*
Pengpeng Zhao et al., Design, Fabrication and Characterization of a Liquid-tunable, Gravity-immune Aspherical Lens, 2016, pp. 1-2 [online], [retrieved Oct. 11, 2024], retrieved from the Internet <URL: https://ieeexplore.ieee.org/stamp/stamp.jsp?tp=&arnumber=7565884>. (Year: 2016).*
Jin-Hui Wang et al., Tunable Liquid Lens Integrated with Aspheric Surface, 445 Optics Communications 56-63 (2019). (Year: 2019).*
Wang Lihui et al, "Variable-focus lens with 30 mm optical aperture based on liquid-membrane-liquid structure", Applied Physics Letters, Apr. 1, 2013 (Apr. 1, 2013), vol. 102, No. 13, p. 131111-131111.
Lei Li et al, "Liquid lens with double tunable surfaces for large power tunability and improved optical performance; Liquid lens with double tunable surfaces for large power tunability and improved optical performance", Journal of Optics, Institute of Physics Publishing, Bristol GB,vol. 13, No. 11, Oct. 28, 2011 (Oct. 28, 2011), p. 115503.

* cited by examiner

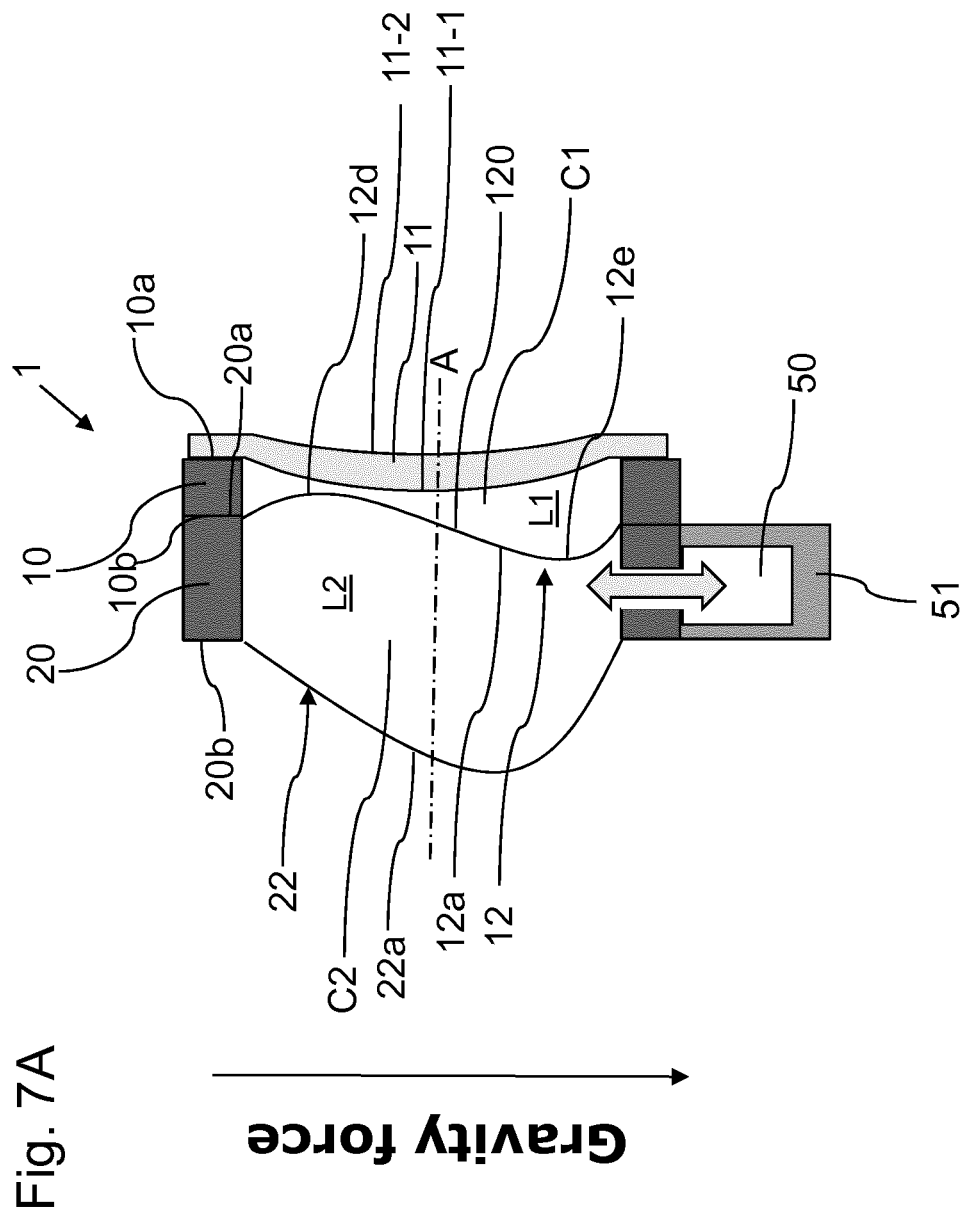

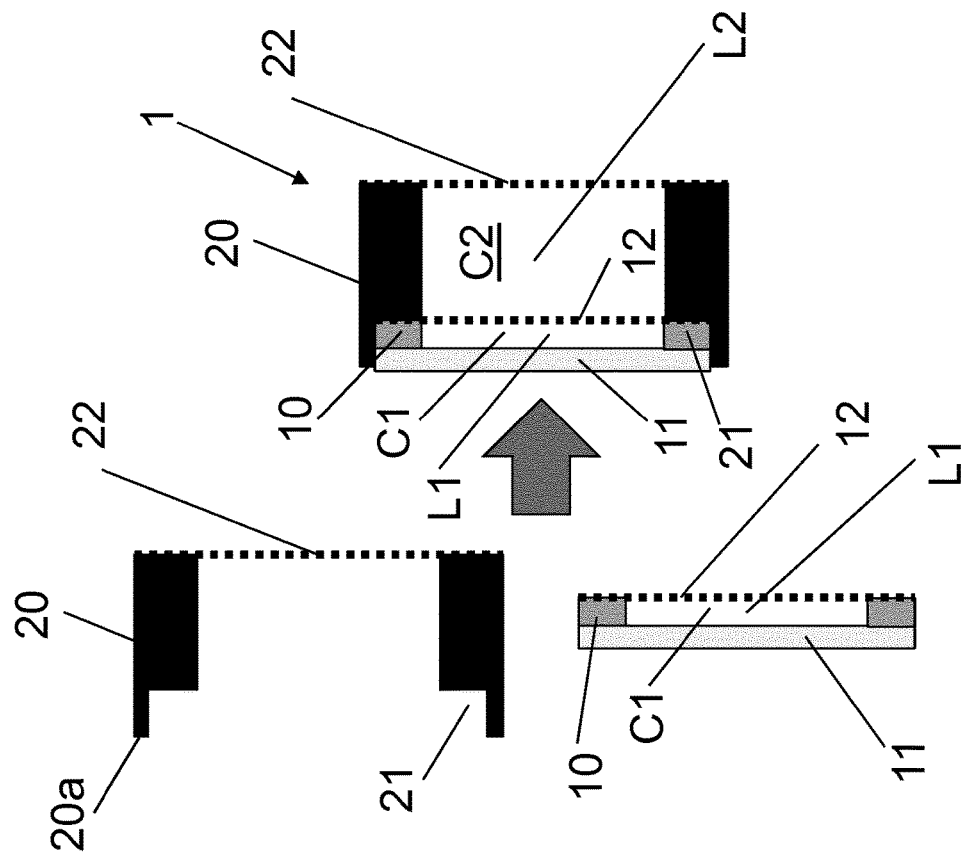
Fig. 9 Lens without gravity coma
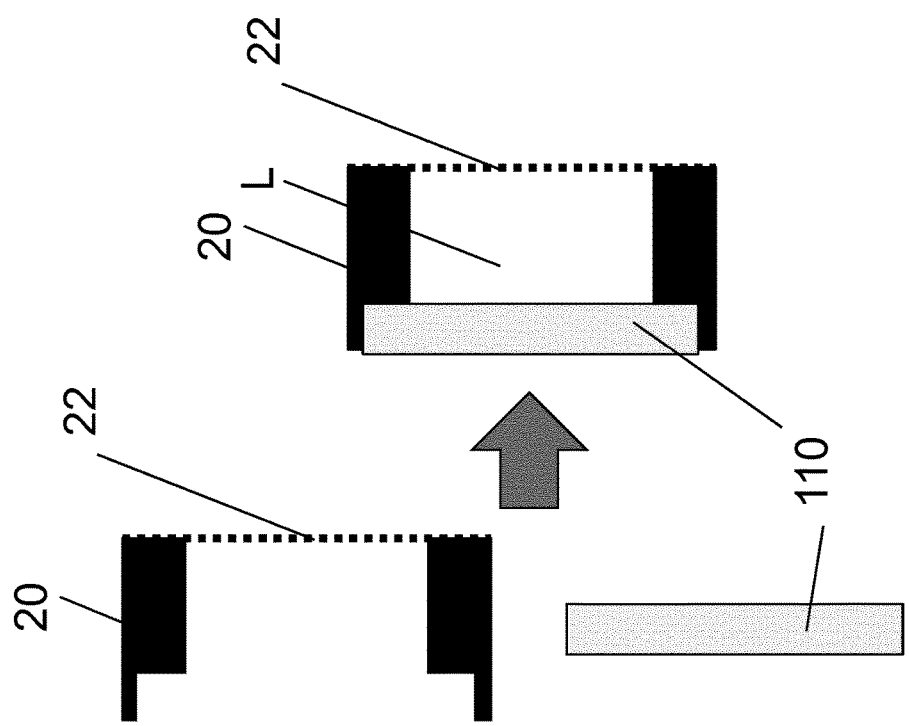
Fig. 8 Lens with gravity coma

ORIENTATION INDEPENDENT COMA COMPENSATING LIQUID LENS

CROSS-REFERENCE TO RELATED APPLICATIONS

This is the U.S. national Stage of International Patent Application No. PCT/EP2019/072524 filed on Aug. 22, 2019, which in turn claims the benefit of European Patent Application No. 18190314.7 filed on Aug. 22, 2018, European Patent Application No. 18198367.7 filed on Oct. 2, 2018, European Patent Application No. 19162999.7 filed on Mar. 14, 2019, and European Patent Application No. 19182421.8 filed on Jun. 25, 2019.

FIELD OF THE INVENTION

The present invention relates to a liquid lens.

Particularly, it is an objective of the present invention to solve the problem of gravity coma of liquid lenses, i.e. to provide reduction of spherical aberrations, particularly a reduction of gravity induced-wavefront aberrations.

BACKGROUND OF THE INVENTION

Gravity-induced vertical coma aberration (herein also denoted as gravity coma) is caused by a hydrostatic pressure differential that results into a non-rotationally symmetric membrane shape. In other words, the weight of the liquid in the lens makes the membrane deformation at the bottom of the lens to be somewhat higher than at the top.

For example, as shown in FIG. 1, at cross section A the optical path (lens thickness) is smaller than in cross section B. The resulting local deflection/optical power at different positions that are at the same distance from the container are different across the liquid lens inducing optical aberrations. So far, cf. e.g. FIG. 2, gravity coma is compensated with a rigid non-adjustable coma plate. This however works only for one fixed orientation and a specific membrane deflection.

Therefore, it is an objective of the present invention to provide an improved lens for reducing gravity coma and more specifically for reducing any gravity-induced aberration.

The term "gravity-induced aberration" particularly refers to an acceleration-dependent aberration caused by a deviation of the membrane shape from a membrane shape, such as spherical, cylindrical or any combination of Zernike terms that would be adopted, if said acceleration would be absent.

This problem is solved by a lens according to claim 1. Preferred embodiments of the lens according to the present invention are stated in the sub claims and are described below.

SUMMARY OF THE INVENTION

According to the invention, a lens is disclosed, comprising
a first chamber (C1) filled with a first transparent liquid (L1) comprising a first mass density ($\rho_1$) and a first refractive index ($n_1$),
a second chamber (C2) filled with a second transparent liquid (L2) comprising a second mass density ($\rho_2$) and a second refractive index ($n_2$), and
a transparent and elastically deformable first membrane (12) that separates the two chambers (C1, C2) from one another and contacts the first liquid (L1) and the second liquid (L2), wherein said mass densities ($\rho_1$, $\rho_2$) and said refractive indices ($n_1$, $n_2$) are selected such that an acceleration-dependent aberration, particularly a gravity-induced aberration, particularly a gravity-induced coma aberration of the lens (1) is reduced or prevented.

In an independent realization of the invention, the invention can be claimed as disclosed in the following:
a lens, comprising:
a first chamber filled with a first transparent liquid comprising a first mass density and a first refractive index,
a second chamber filled with a second transparent liquid comprising a second mass density and a second refractive index, and
a transparent and elastically deformable first membrane that separates the two chambers from one another and contacts the first liquid and the second liquid, wherein said mass densities and said refractive indices are selected such that a gravity-induced coma aberration of the lens is reduced or prevented.

Particularly, in an embodiment, when an optical axis of the lens is in a horizontal position, the first membrane forms on a surface facing the first liquid at least a convex section and at least a concave section so as to reduce or prevent said gravity-induced coma aberration of the lens.

Further, according to an embodiment of the present invention, the mass densities and the refractive indices are selected such that the gravity-induced coma aberration of the lens is reduced or prevented independent of an orientation of the optical axis of the lens. It is noted that while the lens according to the invention compensates or reduces gravity-induced coma aberrations, said lens further implicitly compensates and reduces any gravity-induced surface aberration or changes inherent to lenses having an elastic membrane for adjusting the focal length.

In particular, the lens according to the invention is implicitly configured to compensate and/or reduce membrane surface aberrations that are induced by any external, particularly time-varying force causing an acceleration of the liquids.

Thus, for example when the lens according to the invention is comprised in glasses, aberrations caused by movements (i.e. accelerations) of the wearer, e.g. during walking are reduced or prevented as well.

It is further noted, that for non-round membranes, the "term" coma has to be understood as an aberration induced on the membrane due to an external force such as gravity.

In case of a round membrane not only the coma but also the tilt is compensated and/or reduced by the lens according to the invention.

The present invention can also be applied to an optical element instead of a lens. Such an optical element can comprise the features of the lens according to the invention.

Further, the term "gravity induced coma" or "gravity induced coma aberration" can be replaced in the sub-claims or in the individual embodiments described herein e.g. with "acceleration dependent aberration".

It is explicitly mentioned that throughout the specification, as long as not specified explicitly different, any membrane or an adjustable portion of the membrane of the lens according to the invention can have a non-circular, non-round shape.

Furthermore, according to an embodiment, the first mass density is smaller than the second mass density, and the first refractive index is larger than the second refractive index.

Furthermore, according to an alternative embodiment, the first mass density is larger than the second mass density, and the first refractive index is smaller than the second refractive index.

Further, according to an embodiment, the lens comprises a second transparent and elastically deformable membrane, wherein the second membrane faces the first membrane.

Further, in order to retain the first liquid in the first chamber, the lens comprises a circumferential first lateral wall according to an embodiment. Furthermore, the first lateral wall can comprise a first side and a second side, wherein the second side faces away from the first side. Further, according to an embodiment, the lens comprises a first transparent cover element, wherein the cover element is connected to the lateral wall (i.e. integrally or as a separate element). Particularly, the first transparent cover element can be connected to the first side of the first lateral wall, and wherein the first membrane is connected to the second side of the first lateral wall to enclose the first chamber. However, the cover element can also be integrally formed with the lateral wall, wherein the first membrane is then connected to a face side (termed second side above) of the lateral wall.

Particularly, the cover element is a rigid cover element in contrast to the first or second membrane.

Further, according to an embodiment, the lens comprises a second lateral wall connected to the first lateral wall, wherein the second lateral comprises a first side and a second side, wherein the second side of the second lateral wall faces away from the first side of the second lateral wall, and wherein the first side of the second lateral wall is connected to the first membrane, and wherein the second side of the second lateral wall is connected to the second membrane to enclose the second chamber, so that particularly the first membrane is arranged between the first and the second lateral wall and particularly between the cover element and the second membrane.

For example, the term "connected" particularly refers, to a mechanical link or to a joined assembly of two parts, as for example the mechanical link of a first lateral wall to a second lateral wall. The mechanical link is given, for example, by a face-to-face direct abutting of two parts, for example by two ring-shaped elements being arranged concentrically and having an equal diameter, such as the first and the second lateral wall in certain embodiments.

Furthermore, in the same context the term "connected" particularly refers to a mechanical link or a connection between two ring-shaped elements of different diameters, such as the first and the second lateral wall according to certain embodiments.

In some embodiments an outer diameter of a first element, such as the first particularly ring-shaped wall is greater than the inner diameter of a second element, such as the second particularly ring-shaped lateral wall, or vice versa.

Furthermore, still in the same context regarding the term "connected", the mechanical link between the first and the second lateral wall, or more general between a first and a second element, comprises and involves a third component facilitating the mechanical link, i.e. the connection, between the first and second lateral wall (or more general between the first and the second element). The third component, comprises, for example, one or more of: an elastic clip; a ring, for example a ring of an elastomeric material; a ring comprising a thread; a ring comprising one or more elastically clipping components; a membrane material and/or a membrane portion; an adhesive material; and a soldering material. In some embodiments, the membrane material is compressed between the first lateral wall and the second lateral.

In some embodiments, where the first lateral wall has an outer diameter that is smaller than the inner diameter of the second lateral wall, the third component is a membrane or a membrane portion that establishes a mechanical connection between the first and the second ring, for example as a circular baffle enclosing an aperture of the second lateral wall and a facing aperture of the first lateral wall.

For example, the membrane forms a seal across the aperture of the first lateral wall and a seal across the aperture of the second lateral wall.

For example, an annular portion of the membrane that connects the first lateral wall to the second lateral wall is subject to a tensile stress, for example a radial stress.

For example, one or more of the connected components comprises one or more of: an elastic clip; a screw thread; a low-insertion force socket; a zero insertion force mechanism, for example comprising a lever; a rivet; a screw; a clamp; an adhesive; a bayonet connector; a slot; and a magnet.

A method, in a non-limiting way, to form the connection between a first and a second part comprises, for example, one or more steps comprising: a force insertion step; an adhesion step, for example with an adhesive; a brazing step; a welding step, for example plasma welding; a soldering step; a step comprising forming a magnetizing field; a clamping step; a vacuum forming step; a step comprising placing one or more third components between a first ring and a second ring; a step comprising stretching one or more third components between a first and a second ring; and a step compressing one or more third components between a first and a second ring.

According to a further embodiment, a circumferential, particularly circular edge of the second side of the first lateral wall and/or a circumferential, particularly circular edge of the first side of the second lateral wall forms a first lens shaper that defines a portion of the first membrane, wherein said portion of the first membrane comprises an adjustable curvature, and wherein a circumferential, particularly circular edge of the second side of the second lateral wall forms a second lens shaper that defines a portion of the second membrane, wherein said portion of the second membrane comprises an adjustable curvature. By acting on these portions of the membranes so as to change the respective curvature, the focal length of the lens can be adjusted.

Furthermore, according to an alternative embodiment, the lens comprises a first lens shaper connected to the first membrane and a second lens shaper connected to the second membrane, wherein the first and the second lens shaper are immersed in the second liquid in the second chamber, and wherein the first lens shaper comprises a circumferential, particularly circular inner edge that defines a portion of the first membrane, wherein said portion of the first membrane comprises an adjustable curvature, and wherein the second lens shaper comprises a circumferential, particularly circular inner edge that defines a portion of the second membrane, wherein said portion of the second membrane comprises an adjustable curvature.

Further, according to an embodiment, the second lateral wall comprises a circumferential recess formed in the first side of the second lateral wall, wherein the first lateral wall and the first membrane connected to the second side of the first lateral wall are inserted into said recess.

Particularly, this embodiment is advantageous in case a rigid cover element inserted into said recess before shall be replaced by a substitution element that allows gravity coma correction. This substitution element can then be formed by the first lateral wall and the cover element and first membrane connected thereto.

Further, according to an embodiment, the first lateral wall is elastically deformable and particularly is formed as a bellows, particularly such that the lens allows to compensate a thermal expansion of the first and/or of the second liquid.

Furthermore, according to an embodiment, the lens comprises an e. g. annular lens shaper comprising a circumferential, particularly circular inner edge, wherein the lens shaper is connected to a circumferential boundary region of the second membrane, and wherein the boundary region of the second membrane is connected to a circumferential boundary region of the first membrane, such that the circumferential, particularly circular edge of the lens shaper defines a portion of the second membrane as well as a portion of the first membrane, wherein the respective portion comprises an adjustable curvature, and wherein the two membranes enclose the second chamber.

Further, according to an alternative embodiment, the first membrane comprises a circumferential boundary region that is connected to the second side of the first lateral wall, and wherein the second membrane comprises a circumferential boundary region that is connected (e.g. in a congruent fashion) to the boundary region of the first membrane, such that the first membrane and the second membrane encloses the second chamber.

Particularly, in an embodiment, the first lateral wall forms an (e.g. annular) lens shaper, wherein a circumferential, particularly circular edge of the second side of the first lateral wall defines a portion of the first membrane as well as a portion of the second membrane, wherein the portion of the first membrane comprises an adjustable curvature, and wherein the portion of the second membrane comprises an adjustable curvature.

Further, according to an embodiment of the lens according to the present invention, a stiffness of the first membrane, a stiffness of the second membrane, a volume of the first chamber, a volume of the second chamber, said mass densities and said refractive indices are adapted such that a gravity-induced coma aberration of the first and of the second membrane is compensated, particularly to zero.

Particularly, according to an embodiment, the Zernicke coefficient of the first membrane surface shape $Z_7^{(1)}$ and the second membrane surface shape $Z_7^{(2)}$ is selected such that:

$$\frac{Z_7^{(1)}}{Z_7^{(2)}} = \frac{n_2 - 1}{n_2 - n_1}$$

Particularly, compared to a rigid compensation according to the state of the art, a resulting wavefront has the identical dependence on gravity as the liquid lens, compensating coma in all orientations.

According to another embodiment of the invention, the first and the second membrane are formed out of the same material.

According to another embodiment of the invention, the first membrane comprises a first aperture portion and wherein the second membrane comprises a second aperture portion, wherein the first and the second aperture portion are each defined by an area on the respective membrane through which light can propagate.

According to an embodiment of the invention, the first aperture portion and the second aperture portion have the same size, particularly wherein the first mass density $\rho_1$ is larger than the second mass density $\rho_2$ and first refractive index $n_1$ is smaller than the second refractive index $n_2$.

Further, according to another embodiment, a stiffness $s_1$ of the first membrane and a stiffness $s_2$ of the second membrane is given by $$\frac{s_1}{s_2} = \frac{n_2 - n_1}{n_2 - 1} \frac{\rho_1 - \rho_2}{\rho_2},$$

particularly when the first aperture portion and the second aperture portion have the same size, particularly the same radii or when the lens is configured to project or receive essentially collimated light, particularly wherein the first mass density $\rho_1$ is larger than the second mass density $\rho_2$ and first refractive index $n_1$ is smaller than the second refractive index $n_2$.

This embodiment allows for a coma-compensated lens in optical systems such as tele-lens systems, where an aperture angle of incident light is comparably small, i.e. incident light is essentially collimated.

According to an embodiment of the invention, the first aperture portion is smaller than the second aperture portion, particularly wherein the first mass density $\rho_1$ is larger than the second mass density $\rho_2$ and first refractive index $n_1$ is smaller than the second refractive index $n_2$.

According to another embodiment of the invention, a stiffness $s_1$ of the first membrane and a stiffness $s_2$ of the second membrane is given by:

$$\frac{s_1}{s_2} = \frac{n_2 - n_1}{n_2 - 1} \frac{\rho_1 - \rho_2}{\rho_2} \frac{R_1^3}{R_2^3},$$

wherein $R_1^\square$ is a radius of the first aperture portion and wherein $R_2^\square$ is a radius of the second aperture portion, particularly when the first aperture portion or first radius has a smaller size than the second aperture portion or second radius, particularly wherein the first mass density $\rho_1$ is larger than the second mass density $\rho_2$ and first refractive index $n_1$ is smaller than the second refractive index $n_2$.

This embodiment allows for a coma-compensated lens in optical systems such as wide angle lens systems, where an aperture angle of incident light is comparably large, i.e. incident light is divergent.

This embodiment further allows for a coma-compensated lens having a reduced membrane stiffness ratio $$\frac{s_1}{s_2},$$

thus relaxing physical membrane requirements.

According to another embodiment of the invention, a thickness $t_1$ of the first membrane and a thickness $t_2$ of the second membrane is given by $$\frac{t_1}{t_2} = \frac{n_2 - n_1}{n_2 - 1} \frac{\rho_1 - \rho_2}{\rho_2} \frac{R_1^3}{R_2^3},$$

wherein $R_1^\square$ is a radius of the first aperture portion and wherein $R_2^\square$ is a radius of the second aperture portion, particularly when the first aperture portion or the first radius has a smaller size than the second aperture portion or the second radius, particularly wherein the first mass density $\rho_1$ is larger than the second mass density $\rho_2$ and first refractive index $n_1$ is smaller than the second refractive index $n_2$.

According to another embodiment of the invention, the first lateral wall defines or forms the first aperture portion and the second lateral wall defines or forms the second aperture portion.

Further, according to another embodiment of the invention, first aperture portion is the portion of the first membrane that comprises an adjustable curvature and/or second aperture is the portion of the second that comprises an adjustable curvature.

According to another embodiment of the invention, the lens comprises a first aperture element, wherein the first aperture element limits an optical aperture of the first membrane, particularly to the first aperture portion.

According to another embodiment of the invention, the lens comprises a second aperture element, wherein the second aperture element limits an optical aperture of the second membrane, particularly to the second aperture portion.

According to another embodiment of the invention, the first and/or the second aperture element are comprised by or integrally formed with the first and/or the second lens shaper.

According to another embodiment of the invention, the lens comprises an aperture element comprised by the first transparent cover element.

According to another embodiment of the invention, the first aperture element is comprised by the first transparent cover element.

According to another embodiment of the invention, the second aperture element is comprised by the second transparent cover element.

Furthermore, according to an embodiment, the lens forms an achromat, wherein particularly the first cover element is a plano-convex cover element comprising a concave surface that faces towards the first membrane. Particularly, the first cover element can be formed out of polycarbonate and can comprise a refractive index of $n=1.58$. Particularly, the first liquid in the first chamber adjacent the first cover element comprises a larger dispersion and/or refractive index than the second liquid. Particularly, the first refractive index of the first liquid can be $n_1=1.57$, while the second refractive index of the second liquid can be $n_2=1.3$.

Further, according an embodiment of the present invention, the lens comprises a circumferential first lateral wall, wherein the first lateral wall comprises a first side and a second side, wherein the second side faces away from the first side, and wherein the lens comprises a transparent first cover element, wherein the first cover element is connected to the first side of the first lateral wall, and wherein the first membrane is connected to the second side of the first lateral wall to enclose the first chamber, and wherein the lens comprises a second lateral wall, wherein the second lateral comprises a first side and a second side, wherein the second side of the second lateral wall faces away from the first side of the second lateral wall, and wherein the first side of the second lateral wall is connected to the first membrane, and wherein the second side of the second lateral wall is connected to a transparent second cover element to enclose the second chamber, so that particularly the first membrane is arranged between the first and the second lateral wall and particularly between the two cover elements. Particularly, in contrast to the first membrane, the cover elements are rigid cover elements.

According to another embodiment of the invention, the first cover element has a first curved surface facing towards the first liquid and a second curved surface arranged opposite of the first curved surface particularly facing towards an outside, such as air, of the lens, particularly wherein the first and/or the second curved surface exhibit a curvature such that the first cover element forms a rigid lens.

According to another embodiment of the invention, the first cover element has a first curved surface facing towards the first liquid and a second curved surface arranged opposite of the first curved surface particularly facing towards an outside, such as air, of the lens, particularly wherein the first and the second curved surface have the same curvature, particularly the same radius of curvature, or wherein the first and second curved surfaces have a different curvature forming either a positive meniscus lens or a negative meniscus lens.

This embodiment allows for offsetting the tunable focal power range. For example by providing a negative meniscus providing the cover element with a negative optical power, the lens can be shifted from having a purely positive optical power range (as would be the case when the cover element surfaces would be for example planar), e.g. 0.5 dpt to 3 dpt, to a purely negative optical power range, e.g. −3 dpt to −0.5 dpt.

According to another embodiment, the first and/or the second surface of the cover element is formed such that it provides an optical correction for aberration such as conical or cylinder.

According to a further embodiment of the present invention, the lens comprises an actuator and a pump reservoir in flow connection with the first chamber, wherein the actuator is configured to pump first liquid from the pump reservoir into the first chamber or from the first chamber into the pump reservoir to adjust the curvature of said portion of the first membrane and/or of said portion of the second membrane and therewith the focal length of the lens.

Particularly, in an embodiment, the second chamber is delimited at least partially by an elastically deformable wall portion to compensate a pressure change of the first liquid in the first chamber generated by the actuator.

Further, according to an alternative embodiment of the present invention, the lens comprises an actuator and a pump reservoir in flow connection with the second chamber, wherein the actuator is configured to pump second liquid from the pump reservoir into the second chamber or from the second chamber into the pump reservoir to adjust the curvature of said portion of the first membrane and/or of said portion of the second membrane.

Particularly, in an embodiment, the first chamber is delimited at least partially by an elastically deformable wall portion to compensate a pressure change of the second liquid in the second chamber generated by the actuator.

Further, according to an embodiment of the lens according to the present invention, the lens is configured to be mounted to a further lens, wherein the further lens comprises a transparent cover element, a transparent and elastically deformable membrane, and a lateral wall, wherein the cover element of the further lens and the membrane of the further lens are connected to the lateral wall of the further lens to enclose a chamber of the further lens, wherein the chamber of the further lens is filled with a transparent third liquid, and wherein the lens is configured to be mounted to the further lens such that an air gap is formed between the first cover element of the lens and the membrane of the further lens.

Here, particularly, in this embodiment, the lens e.g. forms a standalone corrective lens element that can be mounted to another lens so as to compensate the gravity coma.

Particularly, according to an aspect of the present invention, a lens system is disclosed comprising the lens and the further lens, wherein the further lens is mounted to the lens such that an air gap is formed between the first cover element of the lens and the membrane of the further lens.

Further, according to an embodiment of the present invention, the lateral walls of the lens are elastically deformable, particularly so as to allow for a thermal expansion of the first and second liquid without imparting a form changing load onto the first and second (particularly rigid) cover element.

Particularly, according to an embodiment, the lateral walls of the lens are elastically deformable in a direction parallel to an optical axis of the lens and/or in a radial direction extending perpendicular to said optical axis.

Particularly, in an embodiment, the first lateral wall is formed as a bellows. Further, according to an embodiment, the second lateral wall is formed as a bellows.

Further, according to an embodiment, a stiffness of the first lateral wall and a stiffness of the second lateral wall is adapted such relative to a coefficient of volumetric thermal expansion of the first liquid and relative to a coefficient of volumetric thermal expansion of the second liquid that the focal power and/or coma aberration compensation of the lens remains constant over temperature of the liquids. Particularly, said stiffnesses of the lateral walls can be equal.

Furthermore, according to an alternative embodiment, a volume of the first chamber and a volume of the second chamber is adapted relative to a coefficient of volumetric thermal expansion of the first liquid and relative to a coefficient of volumetric thermal expansion of the second liquid such that the focal power and/or coma aberration compensation of the lens remains constant over temperature of the liquids. Particularly, here, the stiffnesses of lateral walls can be equal.

Further, according to an alternative embodiment, the first chamber is in flow connection with an elastically deformable first container so as to allow for a thermal expansion of the first liquid without imparting form changing load onto the first cover element, and wherein the second chamber is in flow connection with an elastically deformable second container so as to allow for a thermal expansion of the second liquid without imparting form changing load onto the second cover element.

According to yet another embodiment of the present invention, the lens comprises a circumferential first lateral wall, wherein the first lateral wall comprises a first side and a second side, wherein the second side faces away from the first side, and wherein the lens comprises a first transparent cover element, wherein the first cover element is connected to the first side of the first lateral wall, and wherein the first membrane is connected to the second side of the first lateral wall to enclose the first chamber, and wherein the lens comprises an annular movable lens shaper connected to the first membrane with a first side of the movable lens shaper, and wherein the second membrane is connected with a circumferential boundary region to a second side of the movable lens shaper, such that the two membranes and the movable lens shaper enclose the second chamber, wherein the second side of the movable lens shaper faces away from the first side of the movable lens shaper.

Further, according to an embodiment, the movable lens shaper comprises a first circumferential, particularly circular edge defining a portion of the first membrane and an opposing second circumferential, particularly circular edge defining a portion of the second membrane, wherein said portion of the first membrane comprises an adjustable curvature, and wherein said portion of the second membrane comprises an adjustable curvature.

Here, particularly, both membranes can be deformed over the whole tuning range in the same manner (assuming the membranes comprise the same pre-strain or initial conditions) and therefore, the net lens coma remains constant through the tuning range. This also potentially minimizes the distance of the coma affected light path and further allows using the softer membrane as the active membrane (to be acted on by the actuator) thereby reducing the amount of force required to actuate the lens.

Further, according to another embodiment of the invention, a circumferential, particularly circular edge of the second side of the second lateral wall forms a second lens shaper that defines a portion of the second membrane, wherein said portion of the second membrane comprises an adjustable curvature.

Furthermore, according to an alternative embodiment comprising a movable lens shaper, the lens comprises a circumferential first lateral wall, wherein the first lateral wall comprises a first side and a second side, wherein the second side faces away from the first side, and wherein the lens comprises a first transparent cover element, wherein the first cover element is connected to the first side of the first lateral wall, and wherein the first membrane is connected to the second side of the first lateral wall to enclose the first chamber, and wherein the lens comprises a second lateral wall, wherein the second lateral comprises a first side and a second side, wherein the second side of the second lateral wall faces away from the first side of the second lateral wall, and wherein the first side of the second lateral wall is connected to the first membrane, and wherein the second side of the second lateral wall is connected to the second membrane to enclose the second chamber, so that particularly the first membrane is arranged between the first and the second lateral wall and particularly between the cover element and the second membrane.

Furthermore, according to an alternative embodiment comprising a movable lens shaper, the movable lens shaper is configured and arranged to only adjust the shape of the second membrane.

Particularly, in an embodiment, the first lateral wall forms a fixed lens shaper, wherein a circumferential, particularly circular edge the second side of the first lateral wall defines a portion of the first membrane, wherein said portion of the first membrane comprises an adjustable curvature, and wherein the lens comprises a movable lens shaper connected to the second membrane with a first side of the movable lens shaper, wherein the first side of the movable lens shaper comprises a circumferential, particularly circular edge defining a portion of the second membrane, wherein said portion of the second membrane comprises an adjustable curvature.

Further, according to an embodiment of the present invention, the volume of the first liquid in the first chamber and the volume of the second liquid in the second chamber are adapted such that a thermal drift of the focal length of the lens is reduced or prevented. In other words, said volumes depend on the difference of the volumetric thermal expansion and the difference of the refractive indices of the two liquids. Particularly, in an embodiment, the refractive index of the second liquid is larger than the refractive index of the first liquid.

Further, according to an embodiment, the lens comprises an actuator that is configured to move the movable lens shaper with respect to the first and/or second lateral wall so as to change the curvature of said portions of the first and the second membrane and therewith the focal length of the lens.

Further, according to yet another embodiment of the lens according to the present invention, a wall delimiting the first or second chamber of the lens comprises at least one flexible area to allow for the thermal expansion of the respective liquid.

Furthermore, by choosing e.g. a positive gauge pressure of e.g. the second liquid in the second chamber it is possible according to an embodiment to influence the shapes of the chambers such that when an actuator for pumping e.g. the first liquid is deactivated (off) the second liquid in the second chamber comprises a pressure such that the first chamber forms a concave lens portion and the total focal length of the lens is negative, and wherein when the actuator is activated (on) to pump first liquid from the pump reservoir into the first chamber, the second chamber forms a convex lens portion and the focal length of the lens is positive (here particularly, the first membrane can be flat end may extend parallel to the transparent (first) cover element of the lens. Preferably, according to an embodiment, the first liquid comprises a higher refractive index than the second liquid so that despite a convex shape of the second chamber (when the actuator is off) the lens has an overall negative focal length due to the concave shape of the second chamber.

The term "deactivated" in the context of the current specification particularly refers to the actuator being turned off or adopts a position in which the actuator is brought by equilibrium forces acting on the actuator, for example, given by mechanical characteristics of one or more of the lens and the pressure in one or more of the liquids. Thus, for example, a deactivated actuator returns to an initial actuator position, for example wherein no force is generated by the actuator.

In turn, the term "activated" particularly refers to a state wherein the actuator generates a force and is, for example, actuated to a selected actuator positon.

According to a further aspect of the present invention, eyeglasses, particularly for virtual and augmented reality, are disclosed, the eyeglasses comprising one or two lenses per eyeglass (or per eye of a person wearing the eyeglasses) according to the present invention (the number of lenses may depend on the configuration). The lenses can be combined with different methods to display virtual content such as waveguides, wave reflectors, bird bath designs.

Furthermore, the lens according to the present invention can also be used in an optical zoom device. Here, two such lenses are arranged along an optical path of the zoom device, e.g. such that they face each other in the direction of a common optical axis of the two lenses.

Furthermore, according to another embodiment of the invention, the lens is formed as a contact lens.

BRIEF DESCRIPTION OF THE DRAWINGS

Furthermore, embodiments of the present invention as well as further features and advantages of the present invention shall be described in the following with reference to the Figures, wherein

FIG. 7A shows a schematical cross section of a further modification of the embodiment shown in FIG. 3, wherein here, the first cover element 11 has two curved surfaces;

FIG. 8 shows a schematical cross sectional view of a cover element being mounted to a lateral wall of a liquid lens to form a liquid lens showing gravity-induced coma aberration;

FIG. 9 shows a schematical cross sectional view of a modified cover element being mounted to the lateral wall of FIG. 8 to form a lens comprising compensation of gravity-induced coma aberration;

DETAILED DESCRIPTION OF THE INVENTION

Figure 25:
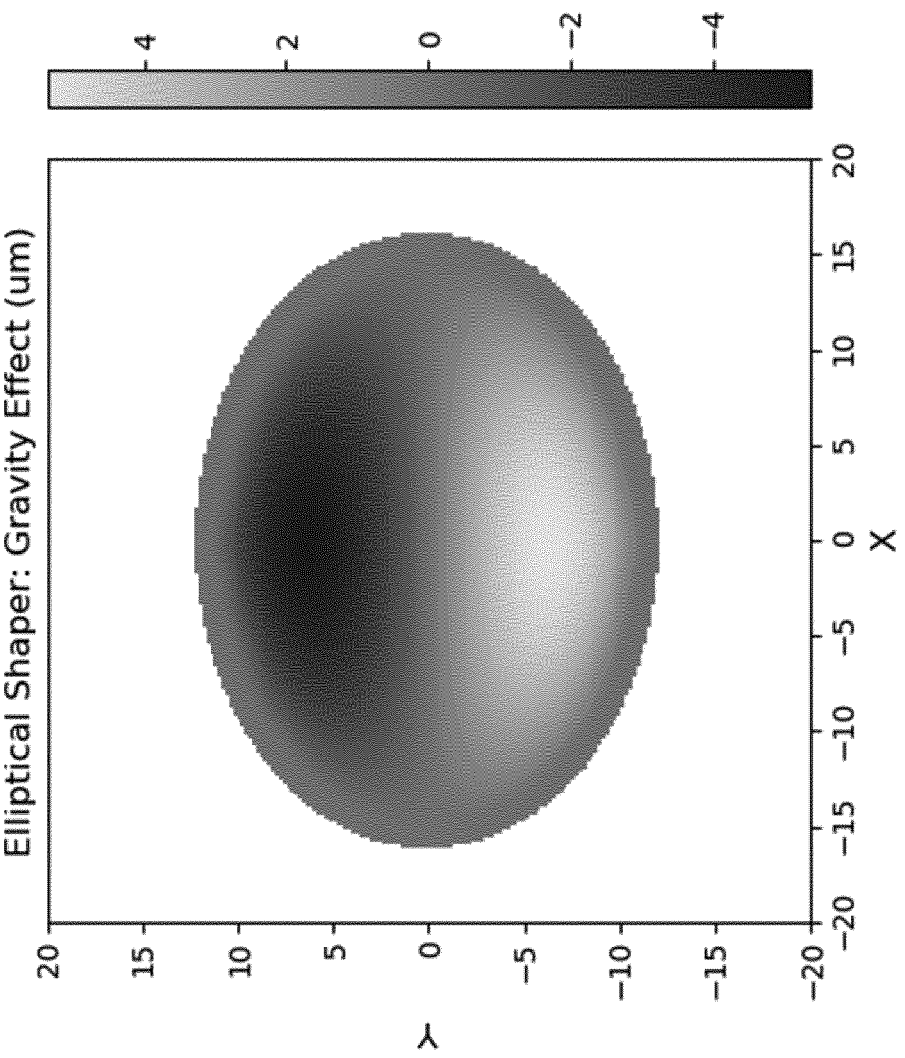
FIG. 25 shows a result of a simulation for a conventional focus-adjustable lens with an elastic membrane suffering from gravity-induced coma and having an elliptical membrane.

While in many embodiments and examples some components of the lens are disclosed as having one or more of a circular shape, aperture, edge, and contour, it is explicitly noted that any of said embodiments and examples are also possible with said components having a non-circular, such as one or more of an oval, an elliptic, and a polygonal aperture, edge or contour (e.g. cf. FIG. 25).

Figure 1:
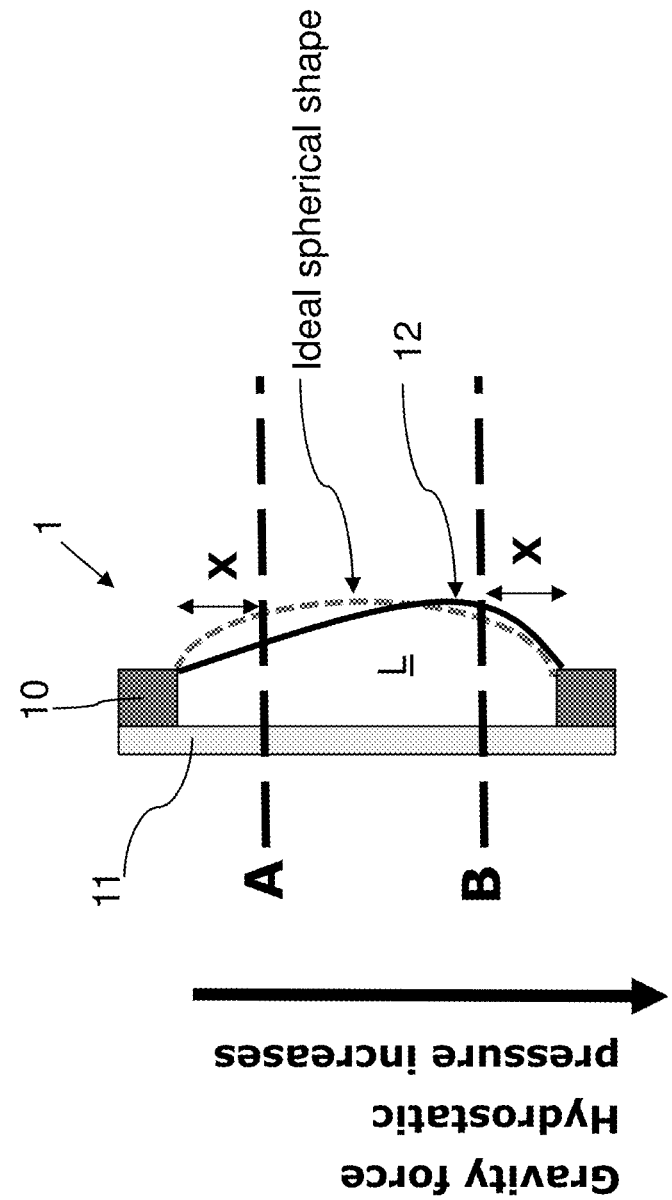
FIG. 1 shows a schematical cross section of a liquid lens to illustrate the occurrence of gravity coma in liquid lenses.

FIG. 1 illustrates how gravity-induced coma aberration is caused in liquid lenses by a hydrostatic pressure differential that results in a non-ideal, particularly non-rotationally symmetric shape of the membrane 12 which encloses together with the lateral wall 10 and the transparent cover element 11 a chamber for accommodating a transparent liquid L. It is noted that in some embodiments the cover element 11 can have an optical power.

For instance, at cross section A the optical path (lens thickness) is smaller than in cross section B. The resulting local deflection/optical power at different positions that are at the same distance from the container of the lens are different across the liquid lens inducing optical aberrations due to a non-spherical, particularly non-ideal membrane shape. Such a wave front error is a result of the weight of the liquid L deforming the membrane 12.

Figure 2:
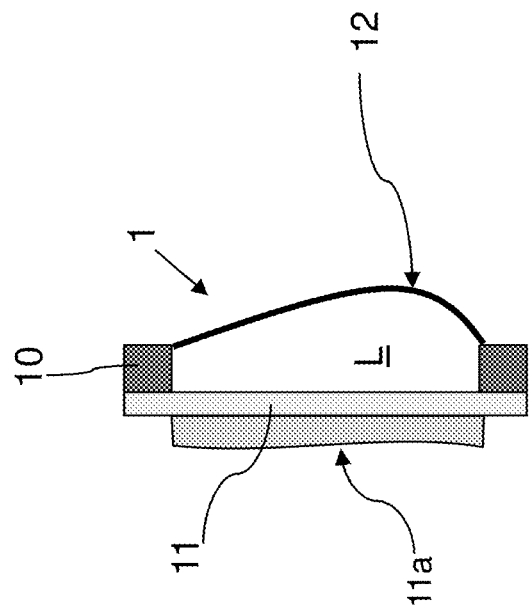
FIG. 2 shows a typical way to compensate gravity induced coma using a rigid optical element.

As indicated in FIG. 2, such gravity coma is usually compensated with a rigid non-adjustable coma plate 11*a*. However, this works only for one fixed orientation and a specific membrane deflection.

Figure 3:
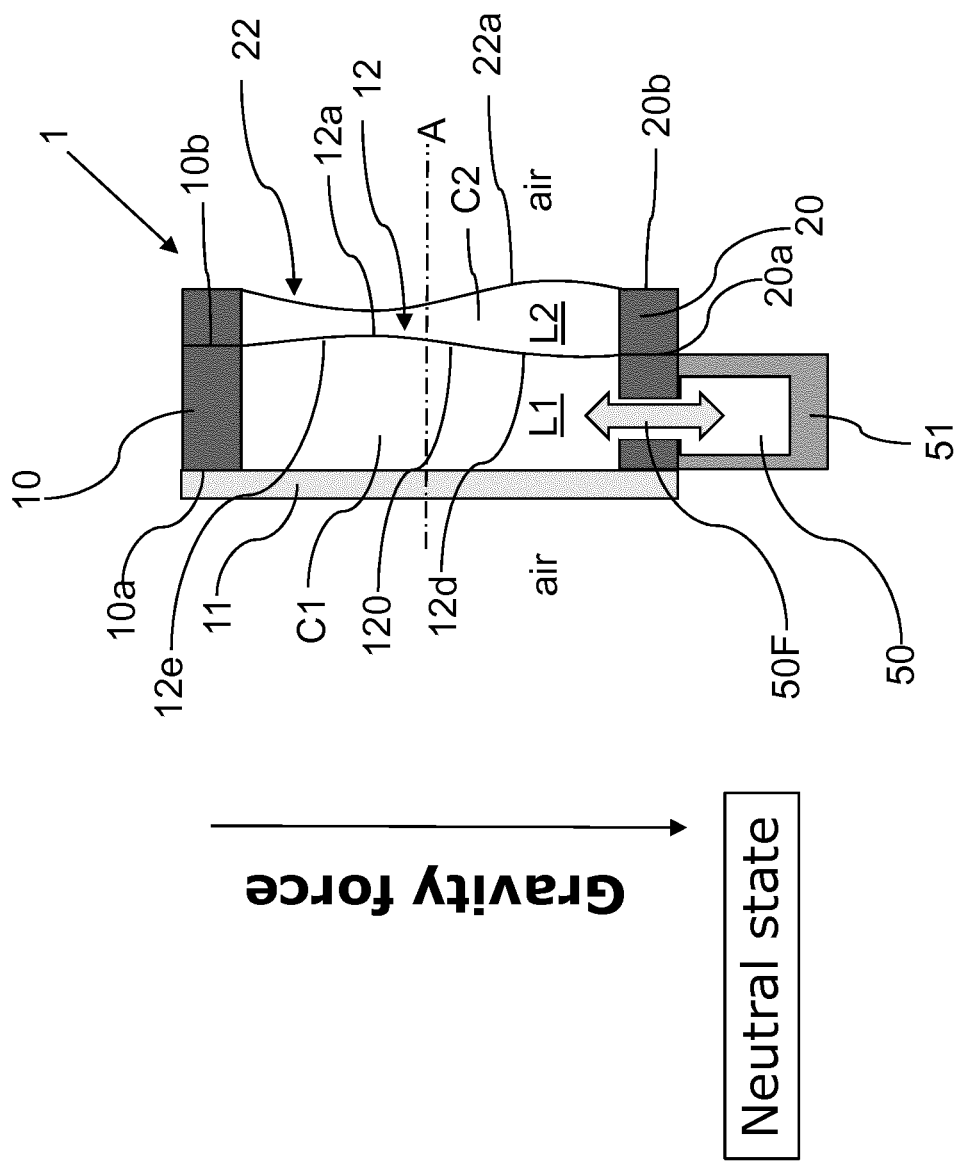
FIG. 3 shows a schematical cross section of an embodiment of a lens according to the present invention, wherein the lens comprises two membranes in a neutral state and a rigid cover element to enclose a first liquid in a first chamber and a second liquid in a second chamber, wherein the focal length is adjusted by pumping a first liquid into or out of the first chamber adjacent the cover element.

In order to solve this problem, the present invention proposes a lens 1 as shown e.g. in FIG. 3, wherein the lens 1 comprises a first chamber C1 filled with a first transparent liquid L1 comprising a first mass density $\rho_1$ and a first refractive index $n_1$, a second chamber C2 filled with a second transparent liquid L2 comprising a second mass density $\rho_2$ and a second refractive index $n_2$, and a transparent and elastically deformable first membrane 12 that separates the two chambers C1, C2 from one another and contacts the first liquid L1 and the second liquid L2. Further, the lens can comprise a second transparent and elastically deformable membrane 22, wherein the second membrane 22 faces the first membrane 12 and also serves to delimit the second chamber C2.

Preferably, said mass densities $\rho_1$, $\rho_2$ and said refractive indices $n_1$, $n_2$ are selected such that a gravity-induced coma aberration of the lens 1 is reduced or prevented. Particularly, when an optical axis A of the lens 1 is in a horizontal position, the first membrane 12 forms on a surface 120 facing the first liquid L1 at least a convex section 12*d* and at least a concave section 12*e* so as to reduce or prevent said gravity-induced coma aberration of the lens 1. Particularly, the mass densities $\rho_1$, $\rho_2$ and the refractive indices $n_1$, $n_2$ are selected such that the gravity induced coma aberration of the lens 1 is reduced or prevented independent of an orientation of the optical axis A of the lens 1.

Particularly, in the embodiment shown in FIG. 3, the first mass density $\rho_1$ is larger than the second mass density $\rho_2$, and the first refractive index $n_1$ is smaller than the second refractive index $n_2$.

According to an example of the present invention, the first liquid L1 comprises a refractive index $n_1=1.30$ and a mass density $\rho_1=1900$ kg/m$^3$, whereas the second liquid comprises a refractive index $n_2=1.38$ and a mass density $\rho_2=1200$ kg/m$^3$. Furthermore, according to an example, the second membrane 22 comprises a stiffness that is 5 to 10 times larger than a stiffness of the first membrane 12.

Particularly, the stiffness described herein is defined by the Poisson's ratio, a material thickness of the respective membrane, and Young's modulus, and particularly corresponds to the engineering strain for an applied engineering stress.

The term "stiffness" particularly refers to a magnitude of the distension of one or more of the first and second membrane for a given pressure or pressure gradient.

Particularly, the properties of the first liquid L1 and the second liquid L2 can be interchanged and after adjustment of the liquid lens chamber's C1, C2 parameters the coma compensating functionality can be maintained in the same manner.

Figure 4:
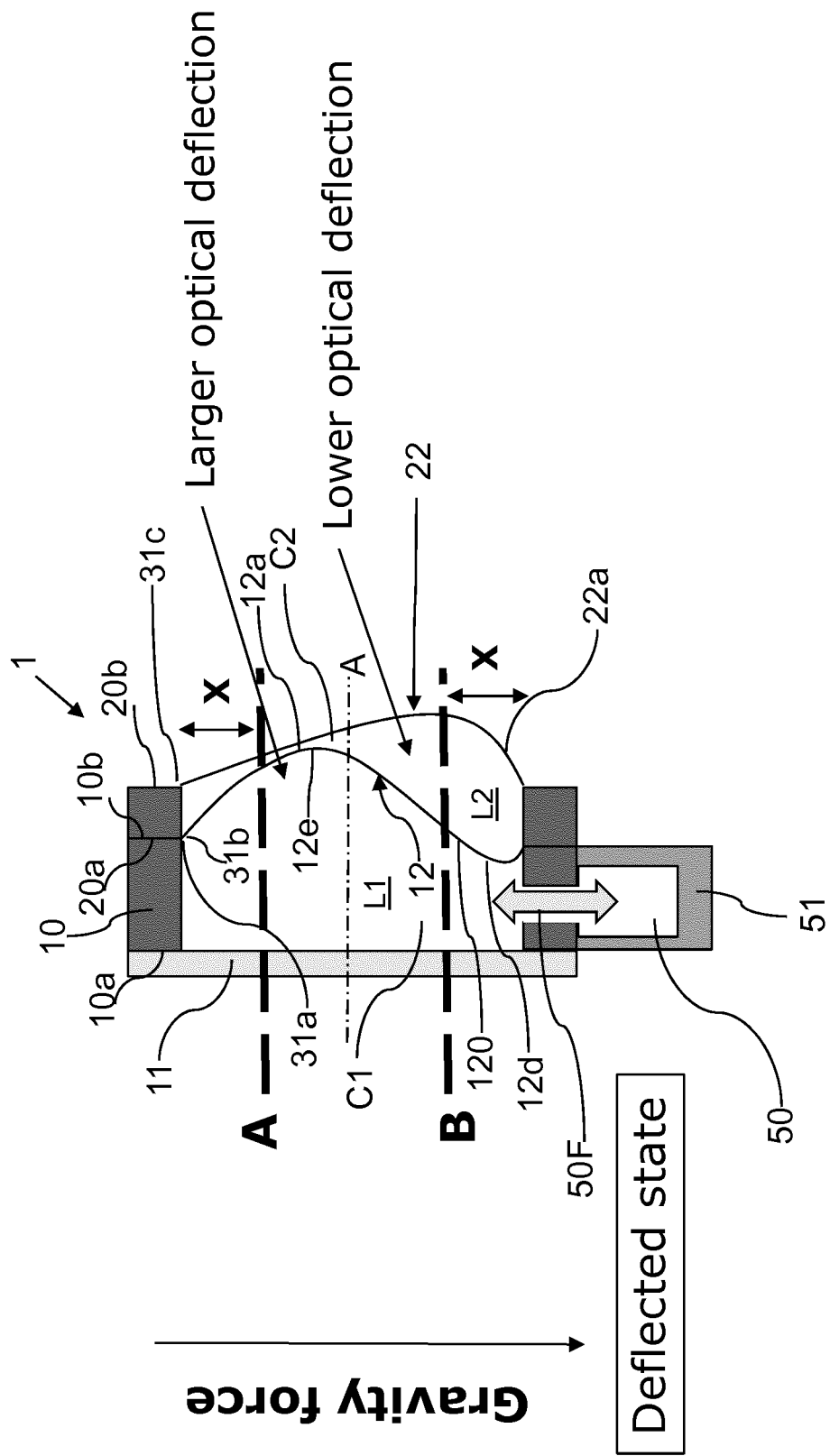
FIG. 4 shows the lens according to FIG. 3, wherein here the membranes are in a deflected state due first liquid pumped into the first chamber.

As indicated in FIG. 3, the lens 1 is shown in a neutral state, while FIG. 4 shows a deflected state of the membrane (i.e. a reduced focal length of the lens 1) that can be achieved by pumping first liquid L1 by means of an actuator 51 out of a pump reservoir 50 into the first chamber. However, the compensation of the gravity-induced coma aberration of the present invention also works in case of a concave state of the lens/membranes.

Particularly, FIG. 4 indicates that regarding the cross section A of the chambers C1, C2, the optical path (lens thickness) is smaller than in the cross section B below. However, the average refractive index is higher (larger deflection) as in the cross section B. Thus, overall the system 1 can be tuned such that the resulting deflection at the same distances from the chambers C1, C2 is similar in all cross section and thereby suppressing optical aberrations.

Particularly, in the embodiment shown in FIGS. 3 and 4, the lens 1 comprises a circumferential first lateral wall 10, wherein the first lateral wall 10 comprises a first side 10*a* and a second side 10*b*, wherein the second side 10*b* faces away from the first side 10*a*, and wherein the lens 1 comprises a first transparent cover element 11, wherein the rigid cover element 11 is connected to the first side 10*a* of the first lateral wall 10, and wherein the first membrane 12 is connected to the second side 10*b* of the first lateral wall 10 to enclose the first chamber C1. Alternatively, the rigid cover element 11 can also be integrally formed with the first lateral wall 10 (this can also be applied to the other embodiments comprising a first lateral wall 10 and a cover element 11). The first membrane 12 is then connected to a face side 10*b* of the lateral wall 10 (or to some other portion of the first lateral 10 to enclose the first chamber C1).

Further, the lens 1 comprises a second lateral wall 20 connected to the first lateral wall 10, wherein the second lateral 20 comprises a first side 20*a* and a second side 20*b*, wherein the second side 20*b* of the second lateral wall 20 faces away from the first side 20*a* of the second lateral wall 20, and wherein the first side 20*a* of the second lateral wall 20 is connected to the first membrane 12, and wherein the second side 20*b* of the second lateral wall 20 is connected to the second membrane 22 to enclose the second chamber C2. Thus, the first membrane 12 is arranged between the first and the second lateral wall 10, 20 and particularly between the cover element 11 and the second membrane 22.

Particularly, as indicated in FIG. 4 a circular edge 31*a* of the second side 10*b* of the first lateral wall 10 and/or a circular edge 31*b* of the first side 20*a* of the second lateral wall 20 forms a first lens shaper that defines a portion 12*a* of the first membrane 12, wherein said portion 12*a* of the first membrane 12 comprises an adjustable curvature. Furthermore, a circular edge 31*c* of the second side 20*b* of the second lateral wall 20 forms a second lens shaper that defines a portion 22*a* of the second membrane 22, wherein said portion 22*a* of the second membrane 22 comprises an adjustable curvature, too.

By acting on these portions 12*a*, 22*a* of the membranes 12, 22 so as to change the respective curvature, the focal length of the lens can be adjusted. Particularly, as already described above, the respective curvature can be adjusted by pumping first liquid L1 from the pump reservoir 50 via a flow connection 50F into the first chamber or vice versa.

Figure 5:
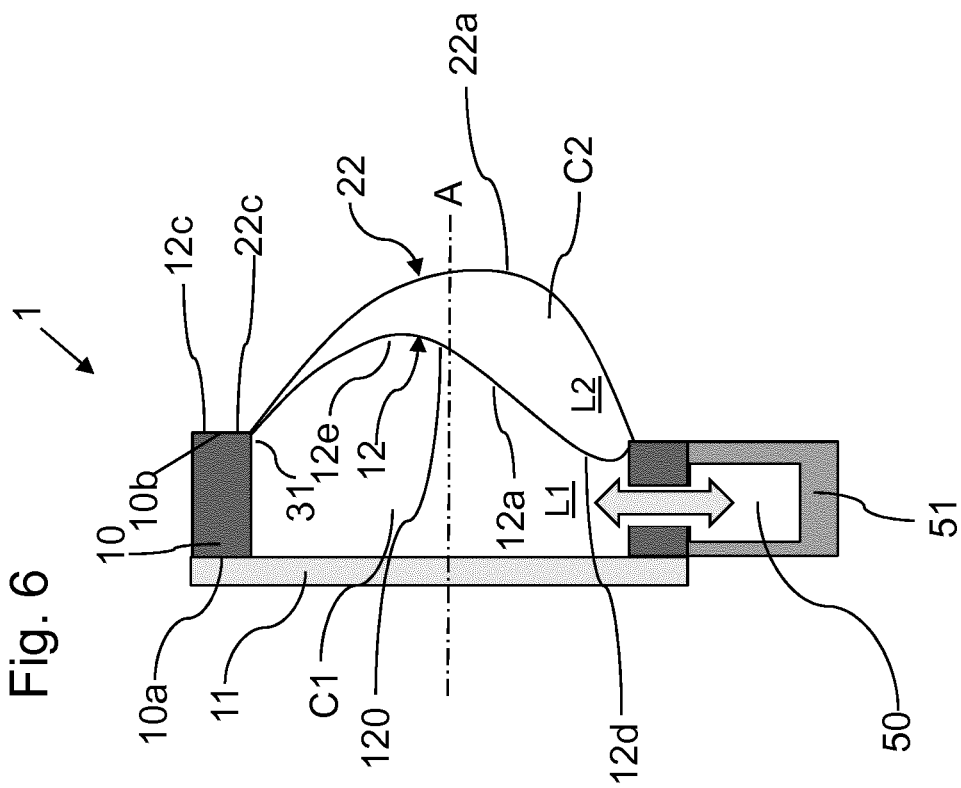
FIG. 5 shows a schematical cross section of a modification of the embodiment shown in FIG. 3, wherein the membranes are in a deflected state.
Figure 6:
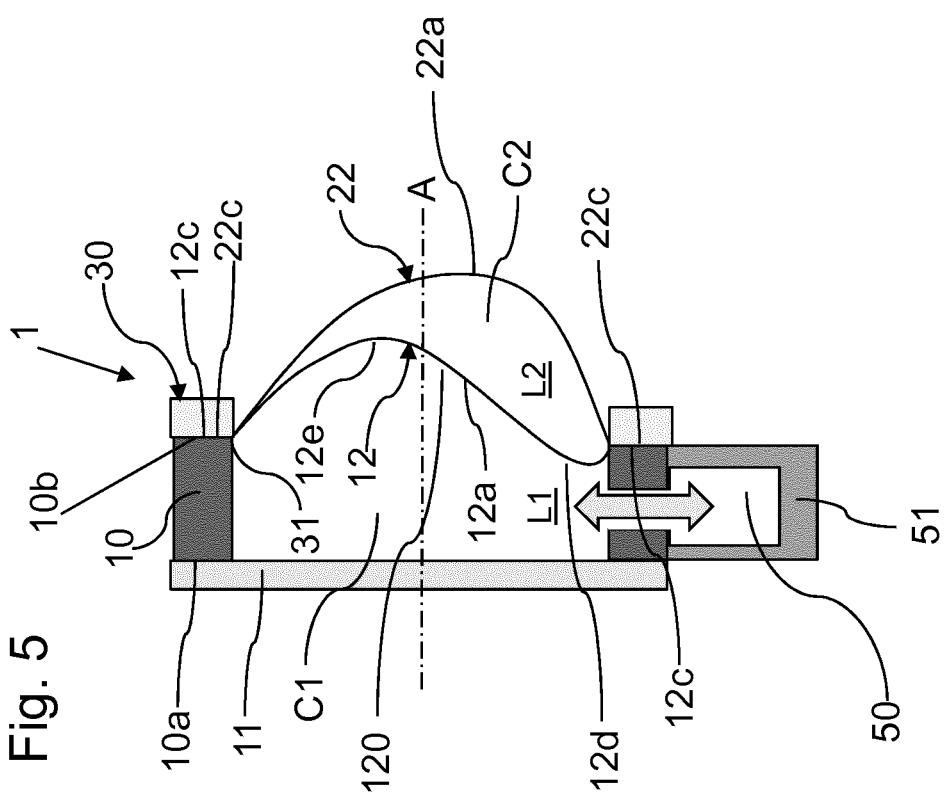
FIG. 6 shows a schematical cross section of a further modification of the embodiment shown in FIG. 3, wherein the membranes are in a deflected state.

Furthermore, the present invention can offer the benefit, as shown e.g. in FIG. 3, that the outer (second) fluid L2 protects the inner (first) fluid L1 from penetrating through the first membrane 12 which increases the number of compatible fluids L1, L2 and the ranges of new physical properties such as refractive indices, viscosities, thermal expansion, density, Abbe number etc. Particularly, as indicated in FIG. 3 for instance the first liquid L1 can be fully encapsulated from the environment. Particularly, the embodiment shown in FIG. 3 replaces an interface sequence first liquid-membrane membrane-air (cf. e.g. FIG. 1) of conventional liquid lenses with the interface sequence first liquid-membrane membrane-second liquid that provides the above listed advantages. FIGS. 5 and 6 show embodiments of a lens 1 according to the present invention that comprise alternative lens shaper configurations.

According to FIG. 5, the lens 1 comprises an e. g. annular lens shaper 30 comprising a circular inner edge 31, wherein the lens shaper 30 is connected to a circumferential boundary region 22*c* of the second membrane 22, and wherein the boundary region 22*c* the second membrane 22 is in turn connected to a circumferential boundary region 12*c* of the first membrane 12, such that the circular edge 31 of the lens shaper 30 defines said portion 22*a* of the second membrane 22 as well as said portion 12*a* of the first membrane 12, wherein here the two membranes 12, 22 enclose the second chamber C2. Thus, the two membranes are fixed between the (single) first lateral wall 10 and the lens shaper 30.

Furthermore, alternatively, as shown in FIG. 6, the first membrane 12 comprises a circumferential boundary region 12*c* that is connected to the second side 10*b* of the first lateral wall 10, and wherein the second membrane 22 comprises a circumferential boundary region 22*c* that is connected (e.g. in a congruent fashion) to the boundary region 12*c* of the first membrane 12, such that the first membrane 12 and the second membrane 22 again enclose the second chamber C2. Here, particularly, the first lateral wall 10 itself forms an e.g. annular lens shaper, wherein a circular edge 31 of the second side 10*b* of the first lateral wall 10 defines said portion 12*a* of the first membrane 12 as well as said portion 22*a* of the second membrane 22.

Figure 7:
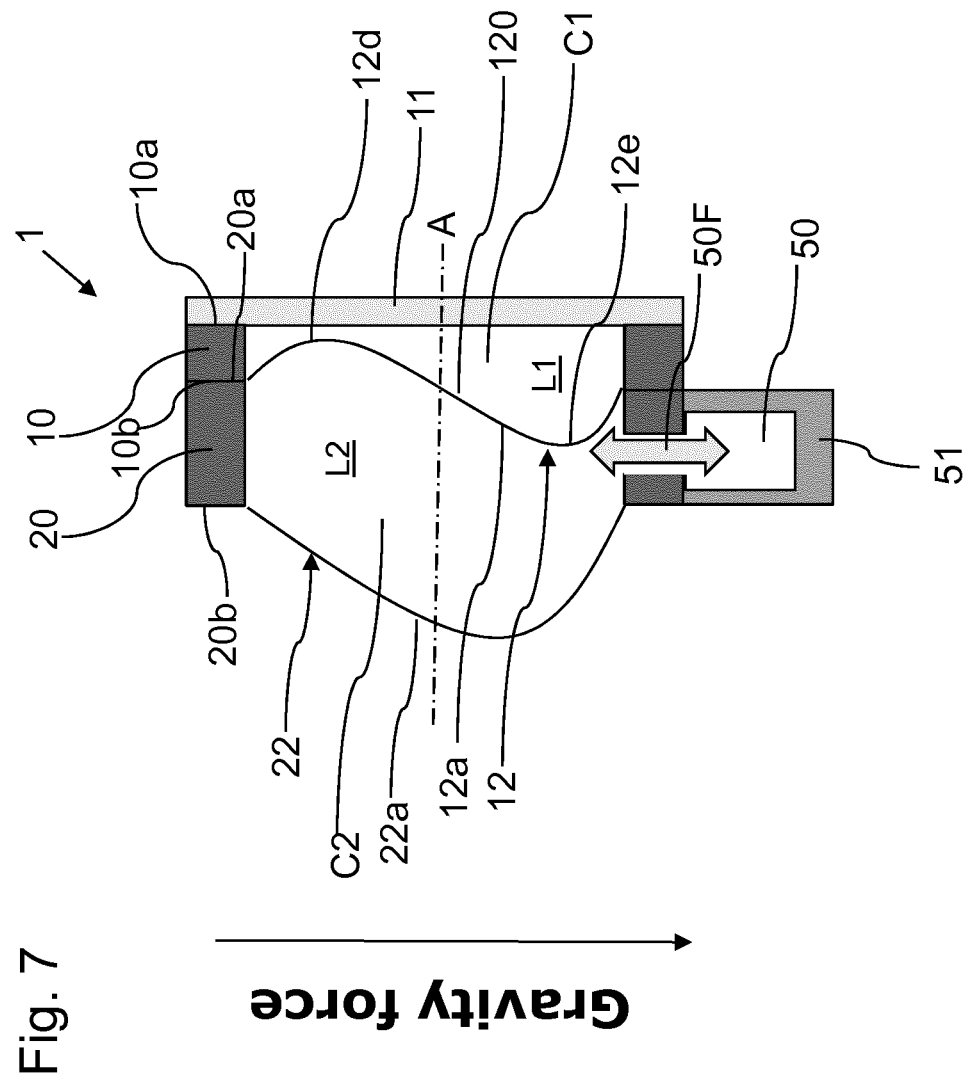
FIG. 7 shows a schematical cross section of a further modification of the embodiment shown in FIG. 3, wherein here, the second liquid is pumped into and out of the second chamber arranged adjacent the outer second membrane of the lens.

Furthermore, as shown in FIG. 7, the design according to the present invention is very flexible and also allows to actuate the second chamber C2 instead to adjust the focal length of the lens, i.e., here the pump reservoir 50 is in flow connection 50F with the second chamber so that second liquid L2 can be pumped into the second chamber C2 or out of the second chamber C2 using the actuator 51.

Furthermore, as shown in FIG. 7A, the design according to the present invention, the first cover element 11 has a first curved surface 11-1 facing the first liquid L1 in the first chamber and a second curved surface 11-2 facing an outside of the lens, e.g. air, such that the lens exhibits an additional optical power provided by the curved first cover element 11. Furthermore, according to FIGS. 8 and 9, the lens according to the present invention allows to integrate the coma compensation function to a large degree into a cover element 11 of the lens 1.

In this regard, FIG. 8 shows a schematical cross sectional view of a cover element 110 being mounted to a lateral wall 20 of a usual liquid lens comprising a membrane 22 to form a liquid lens showing gravity-induced coma aberration.

The present invention now allows to replace such a usual cover element 110 with a cover element 11 being mounted to a first lateral wall and a first membrane 12 so as to enclose the first chamber. This structure can now be mounted to a second lateral wall 20 as shown in FIG. 8 to form a lens 1 that comprises a compensation of gravity-induced coma aberration. Particularly, the second lateral wall 20 comprises a circumferential recess 21 formed in the first side 20*a* of the second lateral wall 20, wherein the first lateral wall 10 and the first membrane 12 connected to the second side 10*b* of the first lateral wall 10 are inserted into said recess 21 to form the compensated lens 1.

Figure 10:
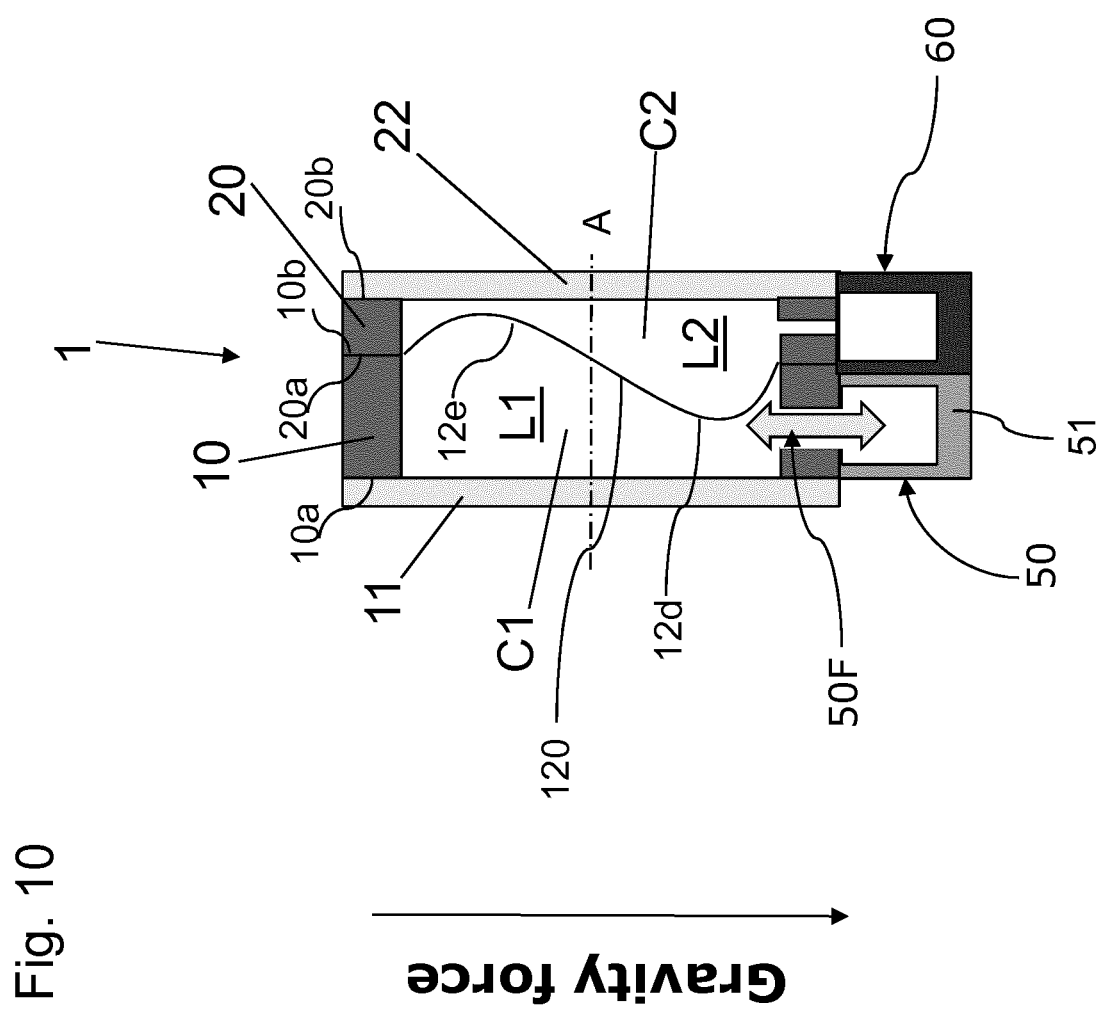
FIG. 10 shows a schematical cross section of a further modification of the embodiment shown in FIG. 3, wherein here, the lens comprises two opposing rigid cover elements.

Furthermore, as shown in FIG. 10 it is not necessary that the lens comprises two flexible membranes 12, 22. Particularly, the second membrane 22 can be replaced by a further transparent and rigid cover element 22 which faces the first cover element 11 in the direction of the optical axis of the lens 1.

Here, besides the pump reservoir 50 being in flow connection 50F with the first chamber C1, the lens 1 comprises an elastically deformable container 60 or flexible side walls 60 to take into account the pressure change of the pump reservoir 50. Particularly, the properties of the first liquid L1 and the second liquid L2 can be interchanged and after adjustment of the liquid lens chamber's C1, C2 parameters the coma compensating functionality is again ensured.

Figure 11:
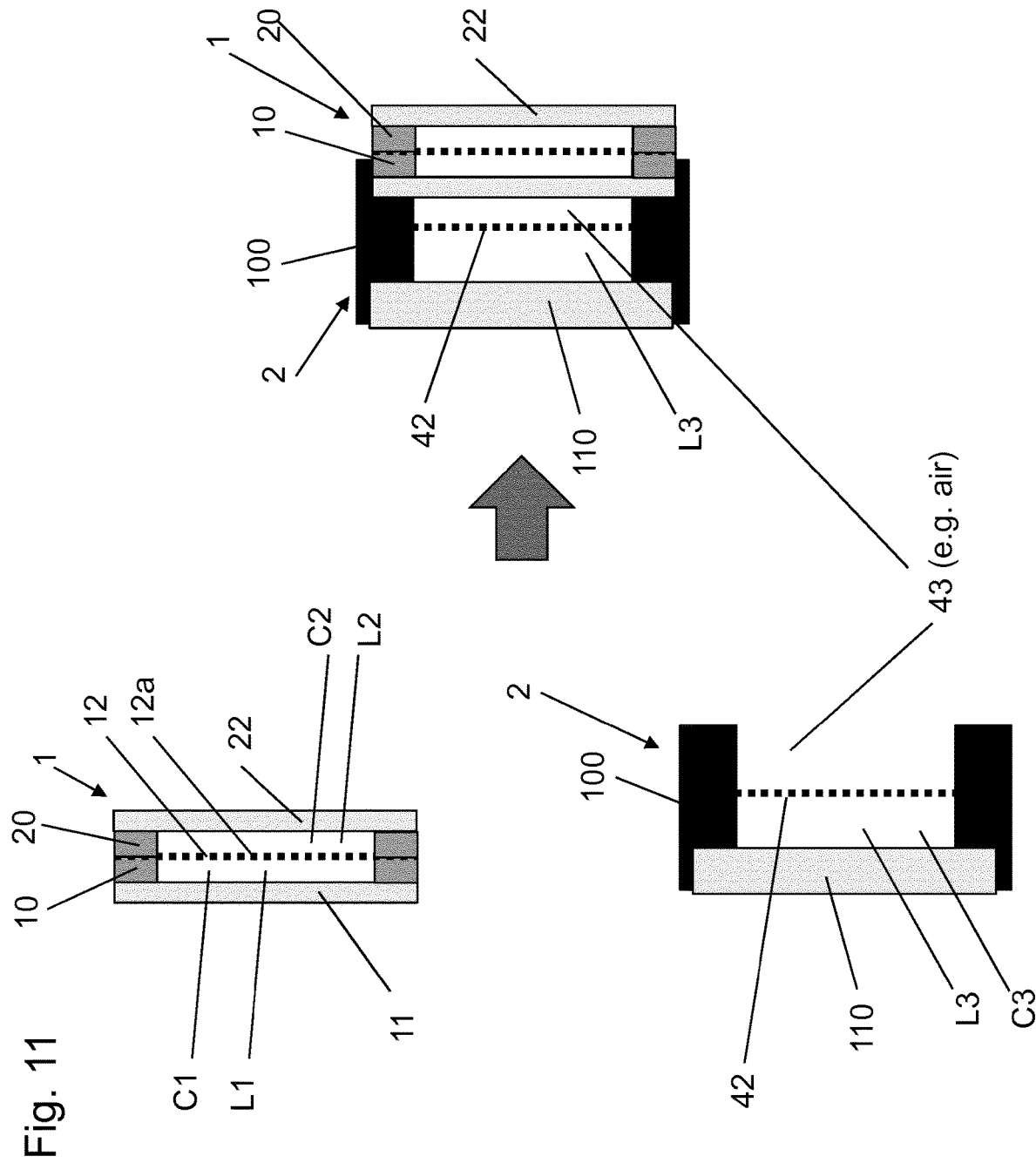
FIG. 11 shows a schematical cross sectional view of a further embodiment of the lens according to the present invention, wherein the lens comprises two opposing rigid cover elements and is particularly configured to serve as a standalone corrective element that is configured to be mounted to a further lens, to provide compensation of gravity-induced coma aberration of the combined lenses.

FIG. 11 shows yet another embodiment of a lens 1 according to the present invention, wherein here the lens 1 particularly forms a standalone corrective element.

Particularly, according to FIG. 11, the lens 1 comprises a circumferential first lateral wall 10, wherein the first lateral wall 10 comprises a first side 10*a* and a second side 10*b*, wherein the second side 10*b* faces away from the first side 10*a*, and wherein the lens comprises a transparent first cover element 11, wherein the first cover element 11 is connected to the first side 10*a* of the first lateral wall 10, and wherein the first membrane 12 is connected to the second side 10*b* of the first lateral wall 10 to form or enclose the first chamber C1, and wherein the lens 1 comprises a second lateral wall 20, wherein the second lateral 20 comprises a first side 20a and a second side 20b, wherein the second side 20b of the second lateral wall 20 faces away from the first side 20a of the second lateral wall 20, and wherein the first side 20a of the second lateral 20 wall is connected to the first membrane 12, and wherein the second side 20b of the second lateral wall 20 is connected to a transparent second cover element 22 to enclose or form the second chamber C2, so that the first membrane 12 is arranged between the first and the second lateral wall 10, 20 and particularly between the two cover elements 11, 22.

Particularly, the two lateral walls 10, 20 are preferably elastically deformable to allow for a thermal expansion of the liquids L1 and L2 without changing the focal power and/or coma aberration compensation of the lens 1.

Particularly, as shown on the right hand side of FIG. 11, the lens 1 is configured to be mounted to a further lens 2, wherein the further lens 2 comprises a cover element 110, a membrane 42 and a lateral wall 100, wherein the cover element 110 of the further lens 2 and the membrane 42 of the further lens 2 are connected to the lateral wall 100 of the further lens 2 to enclose a chamber C3 of the further lens 2, wherein the chamber C3 of the further lens 2 is filled with a transparent third liquid L3, and wherein the lens 1 is configured to be mounted to the further lens 2 such that an air gap 43 is formed between the first cover element 11 of the lens 1 and the membrane 43 of the further lens 2. Particularly, in the embodiment shown in FIG. 11, the mass density of the first liquid L1 is larger than the mass density of the second liquid L2 and the refractive index $n_1$ of the first liquid L1 is smaller than the refractive index of the second liquid to compensate the gravity-induced coma aberration of the whole system comprising the lenses 1 and 2.

In order to adjust the focal length of the combined lens shown in FIG. 11, the lens 1, 2 can be configured such that third liquid L3 can be pumped into the chamber C3 or out of the chamber C3 using e.g. a pump reservoir as described herein.

Figure 12:
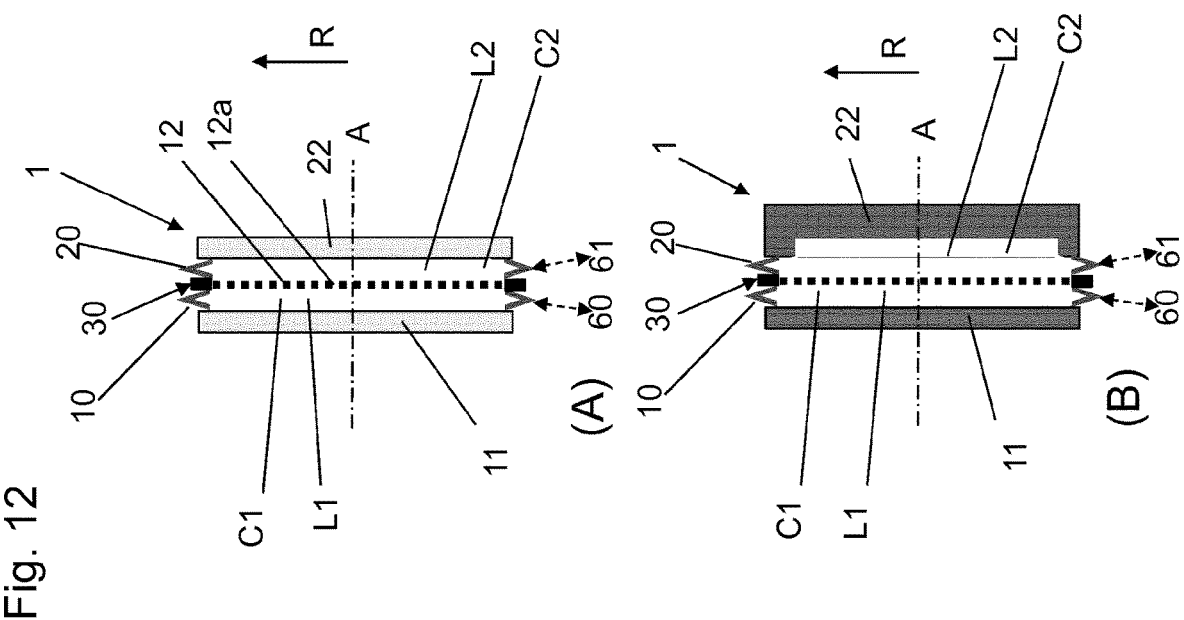
FIG. 12 shows a schematical cross sectional view of a further embodiments (A) and (B) of a lens according to the present invention comprising two opposing rigid cover elements and elastically deformable lateral walls.

FIG. 12 shows a further embodiment (e.g. in form of a standalone corrective element) comprising rigid opposing cover elements 11, 22 and a (single) first membrane 12 arranged between the cover elements 11, 22, wherein the lens 1 further comprises lateral walls 10, 20 that are particularly formed as bellows (or as otherwise elastically deformable lateral walls) and each connect an annular lens shaper 30 to an associated cover element 10, 20, wherein the first membrane 12 is connected to the lens shaper 30 to define an optically active (curvature adjustable) portion 12a of the transparent membrane 12. The membrane 12 may also be connected in other ways to the lateral walls 10, 20. In an embodiment, a separate lens shaper 30 may be omitted.

Here, the lateral walls of the lens 1 are compliant, so as to allow for thermal expansion of the liquids L1, L2 without imparting form changing load onto the outer cover elements (e.g. glass/plastic structures) 11, 22. The lateral walls 10, 20 may be design such that they allow axial and/or radial expansion of the respective lateral wall 10, 20. Alternatively, the walls 10, 20 may be stiff with a channel to a compliant fluid container 60, 61 thereby allowing for thermal expansion. Particularly, the stiffness of the compliant lateral walls 10, 20 may be tuned relative to the coefficients of volumetric thermal expansion of the encapsulated liquids L1, L2 such that the focal power of the lens 1 and/or the gravity coma compensation remains constant over temperature of the liquids L1, L2.

Furthermore, as indicated in the lower portion of FIG. 12, the volumes of the liquid L1, L2 in the chambers C1, C2 may be tuned with respect to the coefficients of volumetric thermal expansion of the liquids L1, L2 such that the membrane 12 will maintain a constant form over the temperature range when utilizing compliant walls 10, 20 of e.g. equivalent stiffness.

Figure 13:
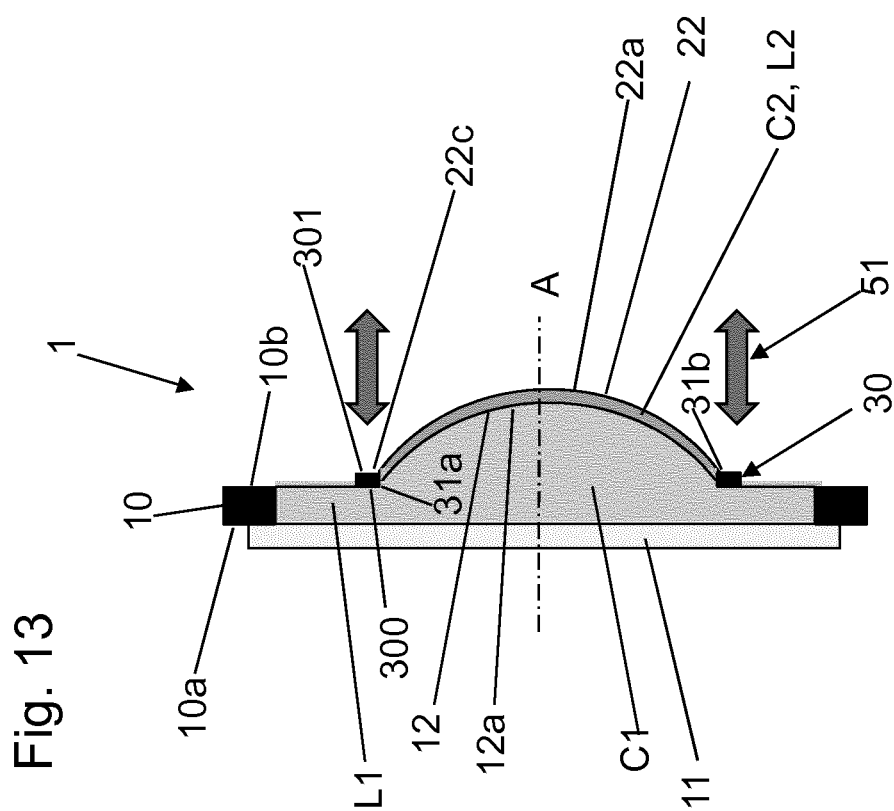
FIG. 13 shows a schematical cross sectional view of a further embodiment of a lens according to the present invention, wherein the lens comprises a movable lens shaper for adjusting the focal length of the lens.

Furthermore, FIG. 13 shows an embodiment of a lens 1 according to the present invention, wherein both liquids L1, L2 are part of the active part such that both membranes 12, 22 increase in stiffness equivalently through the tuning range (assuming the same initial membrane properties) and therefore the net lens coma remains constant through the tuning range. Particularly, this also potentially minimizes the distance of the coma affected light path, which can be important for larger field of views (FOV) and large lens deflections. Furthermore, this also enables the softer membrane to be used as the active membrane thereby reducing the amount of force required to actuate the lens 1.

The term "active membrane" particularly refers to the membrane 12 or 22 that is used as portion of a flexible, particularly lateral, chamber wall allowing for compression of said chamber, for example by a method comprising moving the lens shaper 30 with a force that is smaller than the force that would be used with a stiffer membrane.

Particularly, as shown in FIG. 13, the lens 1 comprises a circumferential first lateral wall 10, wherein the first lateral wall 10 comprises a first side 10a and a second side 10b, wherein the second side 10b faces away from the first side 10a, and wherein the lens 1 comprises a first transparent and rigid cover element 11, wherein the first cover element 11 is connected to the first side 10a of the first lateral wall 10, and wherein the first membrane 12 is connected to the second side 10b of the first lateral wall 10 to form/enclose the first chamber C1, and wherein the lens 1 comprises an annular movable lens shaper 30 connected to the first membrane 12 with a first side 300 of the movable lens shaper 30. Further, the second membrane 22 is connected with a circumferential boundary 22c region to a second side 301 of the movable lens shaper 30, such that the two membranes 12, 22 and the movable lens shaper 30 enclose the second chamber C2, wherein the second side 301 of the movable lens shaper 30 faces away from the first side 300 of the movable lens shaper 30.

Particularly, the movable lens shaper 30 comprises a first circular edge 31a defining a portion 12a of the first membrane 12, and an opposing second circular edge 31b defining a portion 22a of the second membrane 22, wherein said portion 12a of the first membrane 12 comprises an adjustable curvature, and wherein said portion 22a of the second membrane 22 comprises an adjustable curvature.

In order to change the focal length of the lens 1, the lens 1 further comprises an actuator 51 that is configured to move the movable lens shaper 30 with respect to the first lateral wall 10 so as to change the curvature of said portions 12a, 22a of the first and the second membrane 12, 22 and therewith the focal length of the lens 1.

The change in curvature of said portions 12a, 22a is affected due to the fact that the liquids L1, L2 are incompressible so that the portions 12a, 22a get elastically deformed when the lens shaper compresses the chambers C1, C2 (or when such compression is reduced).

Figure 13A:
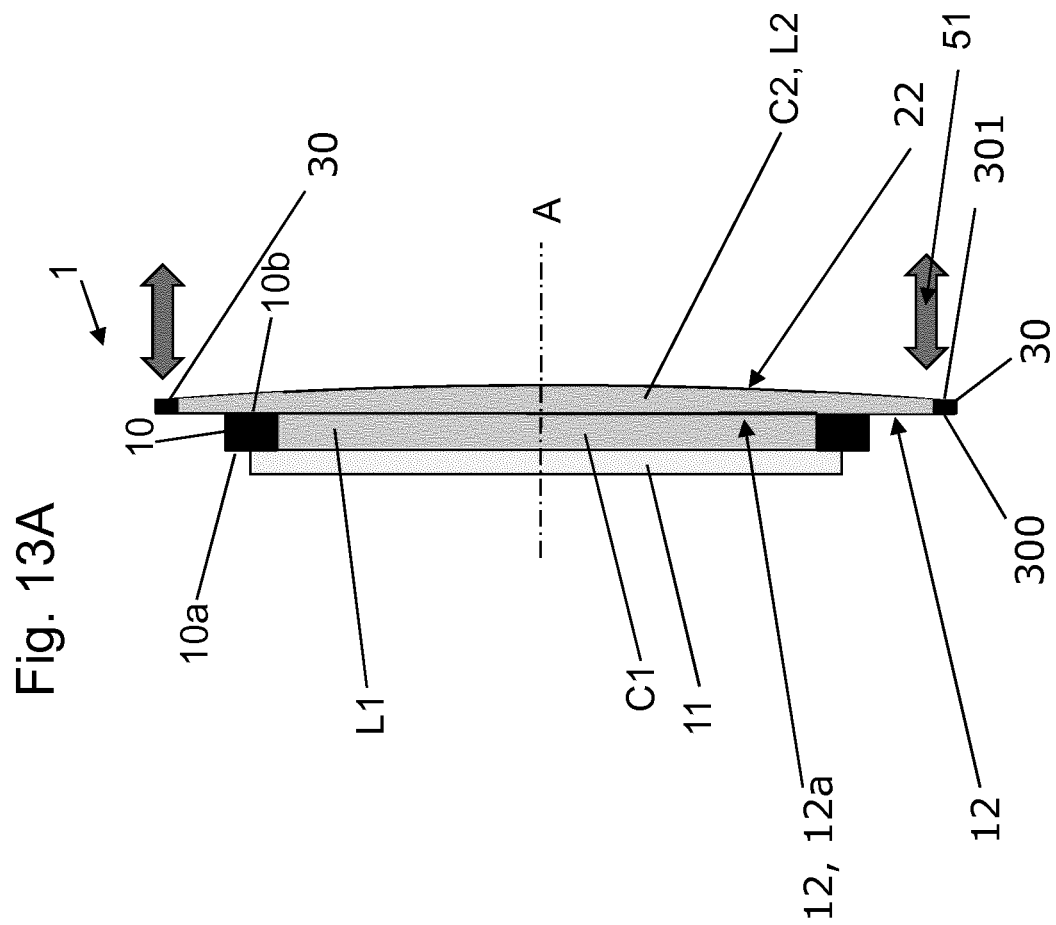
FIG. 13A shows a schematical cross-sectional view of a further embodiment of a lens according to the present invention, wherein the lens comprises a movable lens shaper for adjusting the focal length of the lens and an active membrane.

FIG. 13A shows another exemplary embodiment of a lens 1 according to the invention. The lens 1 comprises a circumferential first lateral wall 10, wherein the first lateral wall 10 comprises a first side 10a and a second side 10b, wherein the second side 10b faces away from the first side 10a, and wherein the lens 1 comprises a first transparent and rigid cover element 11, wherein the first cover element 11 is connected to the first side 10a of the first lateral wall 10, and wherein the first membrane 12 is connected to the second side 10b of the first lateral wall 10 to form/enclose the first chamber C1. The first membrane 12 extends laterally beyond the first lateral wall 10. The movable lens shaper 30 is connected to the first membrane 12 with a first side 300 of the movable lens shaper 30. Further, the second membrane 22 is connected with to a second side 301 of the movable lens shaper 30, such that the two membranes 12, 22 and the movable lens shaper 30 enclose the second chamber C2 with the second liquid L2, wherein the second side 301 of the movable lens shaper 30 faces away from the first side 300 of the movable lens shaper 30.

Like the first membrane 12, the second membrane 22 extends laterally beyond the first wall 10. The movable lens shaper 30 is arranged at an outer perimeter of the lens 1. The first membrane 12 also acts as an active membrane. In order to change the focal length of the lens 1, the lens 1 further comprises an actuator 51 that is configured to move the movable lens shaper 30 with respect to the first lateral wall 10 so as to change the curvature of said portions 12a, 22a of the first and the second membrane 12, 22 and therewith the focal length of the lens 1.

Figure 14:
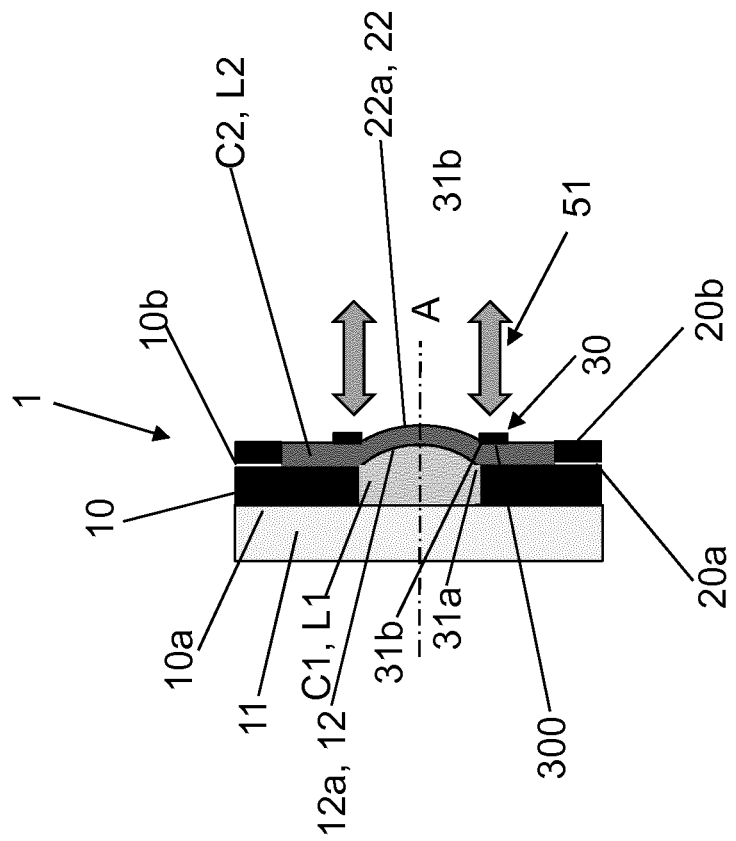
FIG. 14 shows a schematical cross sectional view of a further embodiment of a lens according to the present invention comprising a movable lens shaper for adjusting the focal length of the lens.

FIG. 14 shows a further embodiment of the lens 1 according to the present invention using a movable lens shaper. Here, particularly, the volumes of the liquids in the chambers C1, C2 are selected so as to minimize the net thermal focal power drift of the lens 1. Particularly, said volumes are functions of the coefficients of volumetric thermal expansion of the liquids L1, L2 and of the relative refractive indices $n_1$, $n_2$ of the two liquids L1, L2. In the embodiment shown in FIG. 13, the second liquid L2 preferably is the higher refractive index liquid.

Particularly, as indicated in FIGS. 14, the lens 1 comprises a circumferential first lateral wall 10, wherein the first lateral wall 10 comprises a first side 10a and a second side 10b, wherein the second side 10b faces away from the first side 10a, and wherein the lens 1 comprises a first transparent cover element 11, wherein the first cover element 11 is connected to the first side 10a of the first lateral wall 10, and wherein the first membrane 12 is connected to the second side 10b of the first lateral wall 10 to form/enclose the first chamber C1, and wherein the lens 1 comprises a second lateral wall 20, wherein the second lateral 20 comprises a first side 20a and a second side 20b, wherein the second side 20b of the second lateral wall 20 faces away from the first side 20a of the second lateral wall 20, and wherein the first side 20a of the second lateral 20 wall is connected to the first membrane 12, and wherein the second side 20b of the second lateral wall 20 is connected to the second membrane 22 to enclose/form the second chamber C2, so that the first membrane 12 is arranged between the first and the second lateral wall 10, 20 and particularly between the cover element 11 and the second membrane 22.

Particularly, the first lateral wall 10 forms a fixed lens shaper, wherein a circular edge 31a the second side 10b of the first lateral wall 10 defines a portion 12a of the first membrane 12, wherein said portion 12a of the first membrane 12 comprises an adjustable curvature, and wherein the lens 1 comprises a movable lens shaper 30 connected to the second membrane 22 with a first side 300 of the movable lens shaper 30, wherein the first side 300 of the movable lens shaper 30 comprises a circular edge 31b defining a portion 22a of the second membrane 22, wherein said portion 22a of the second membrane 22 comprises an adjustable curvature.

Also here, the lens 1 preferably comprises an actuator 51 that is configured to move the movable lens shaper 30 with respect to the first and/or second lateral wall 10, 20 so as to change the curvature of said portions 12a, 22a of the first and the second membrane 12, 22 and therewith the focal length of the lens 1.

Figure 15:
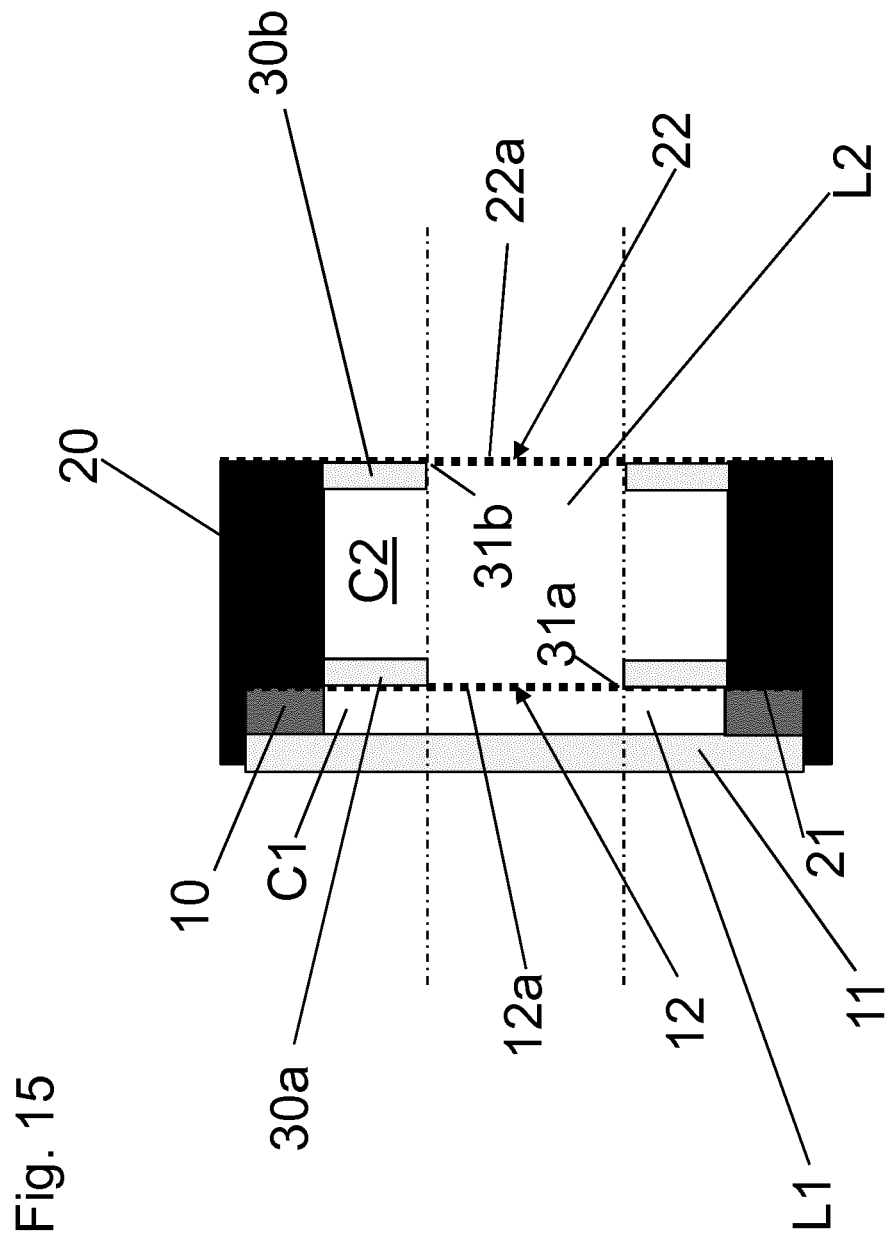
FIG. 15 shows a schematical cross sectional view of a further embodiment of a lens according to the present invention comprising immersed lens shapers.

Furthermore, FIG. 15 shows a further embodiment of a lens 1 according to the present invention, particularly in form of a coma corrective cover element for lenses with an immersed lens shaper. Particularly, in order to make a passive coma compensation work for lenses 1 that comprise an immersed lens shaper (e.g. in spectacles or augmented reality glasses) it is advantageous to introduce a second immersed lens shaper for the first membrane 12, wherein particularly two lens shapers, namely a first and a second lens shaper, 30a, 30b are preferably aligned with respect to each other.

Particularly, according to FIG. 15, the lens 1 comprises the first lens shaper 30a connected to the first membrane 12 and a second lens shaper 30b connected to the second membrane 22, wherein the first and the second lens shaper 30a, 30b are immersed in the second liquid L2 in the second chamber C2, and wherein the first lens shaper 30a comprises a circular inner edge 31a that defines a portion 12a of the first membrane 12, wherein said portion 12a of the first membrane 12 comprises an adjustable curvature, and wherein the second lens shaper 30b comprises a circular inner edge 31b that defines a portion 22a of the second membrane 22, wherein said portion 22a of the second membrane 22 comprises an adjustable curvature. Also here, the focal length may be adjusted by pumping first liquid into the first chamber C1 or out of the first chamber or by pumping second liquid into the second chamber C2 or out of the second chamber C2 as described herein (e.g. by using a pump reservoir as described herein).

Figure 16:
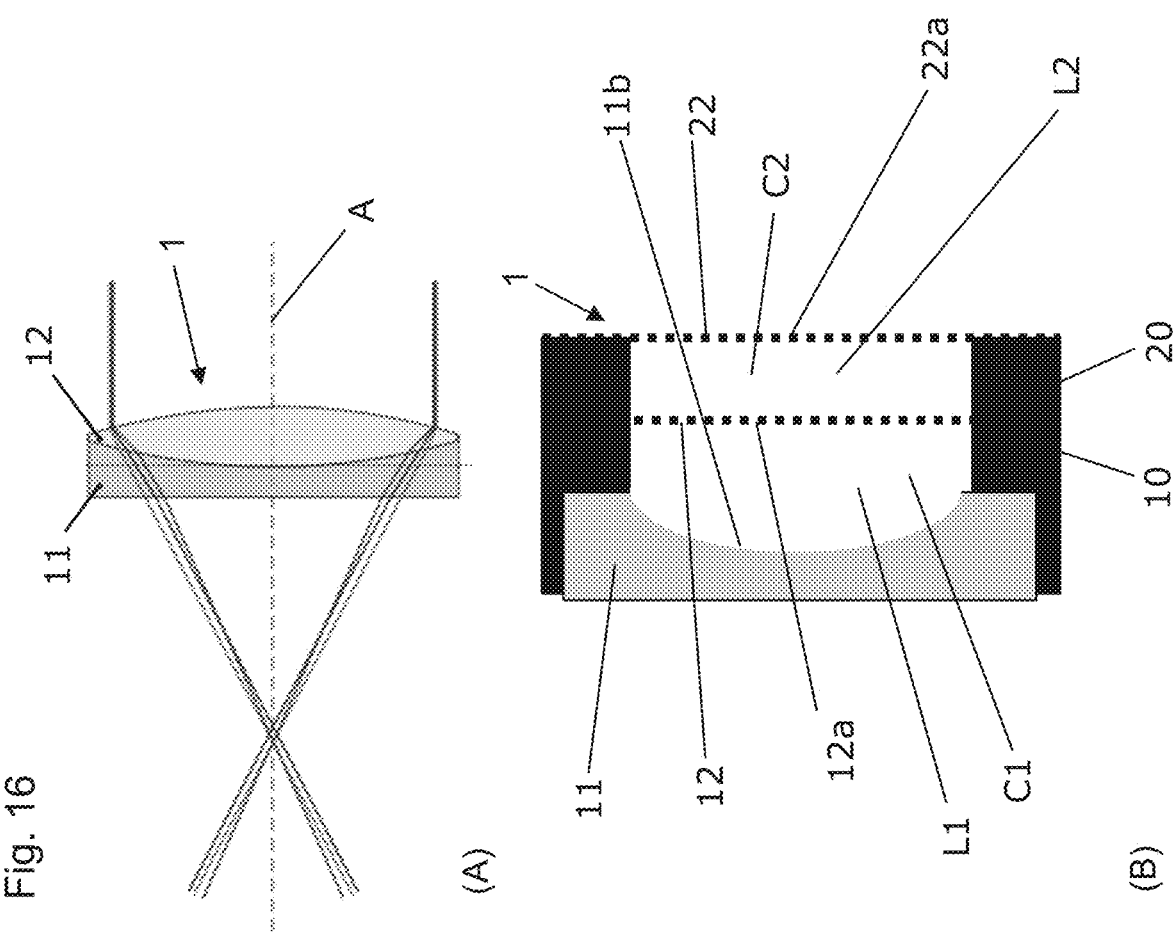
FIG. 16 shows a schematical cross sectional view of a further embodiment of a lens according to the present invention configured as an achromat.

As further shown in FIG. 16 each lens described herein may also form an achromat, wherein particularly the first cover element 11 can be designed as a plano-concave cover element 11 comprising a concave surface 11b that faces towards the first membrane 12. Particularly, the first cover element 11 can be formed out of polycarbonate and can comprise a refractive index of n=1.58. Particularly, the first liquid L1 in the first chamber C1 adjacent the first cover element 11 can comprise a larger dispersion and/or refractive index than the second liquid L2. Particularly, the first refractive index $n_1$ of the first liquid L2 can be $n_1$=1.57, while the second refractive index $n_2$ of the second liquid L2 can be $n_2$=1.3.

Figure 17:
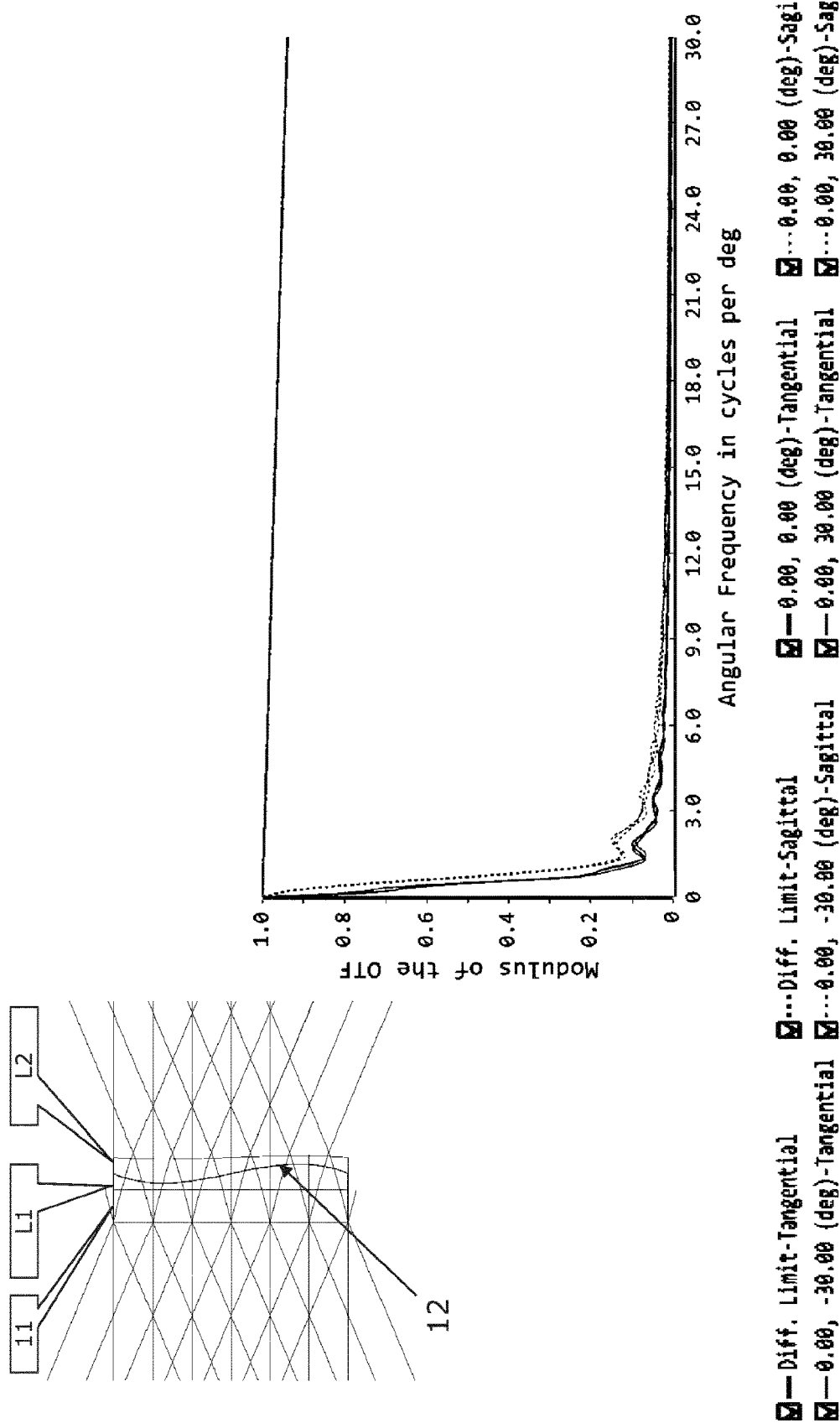
FIG. 17 shows data relating to gravity-induced coma aberration on an outer membrane of a liquid lens without coma compensation.
Figure 18:
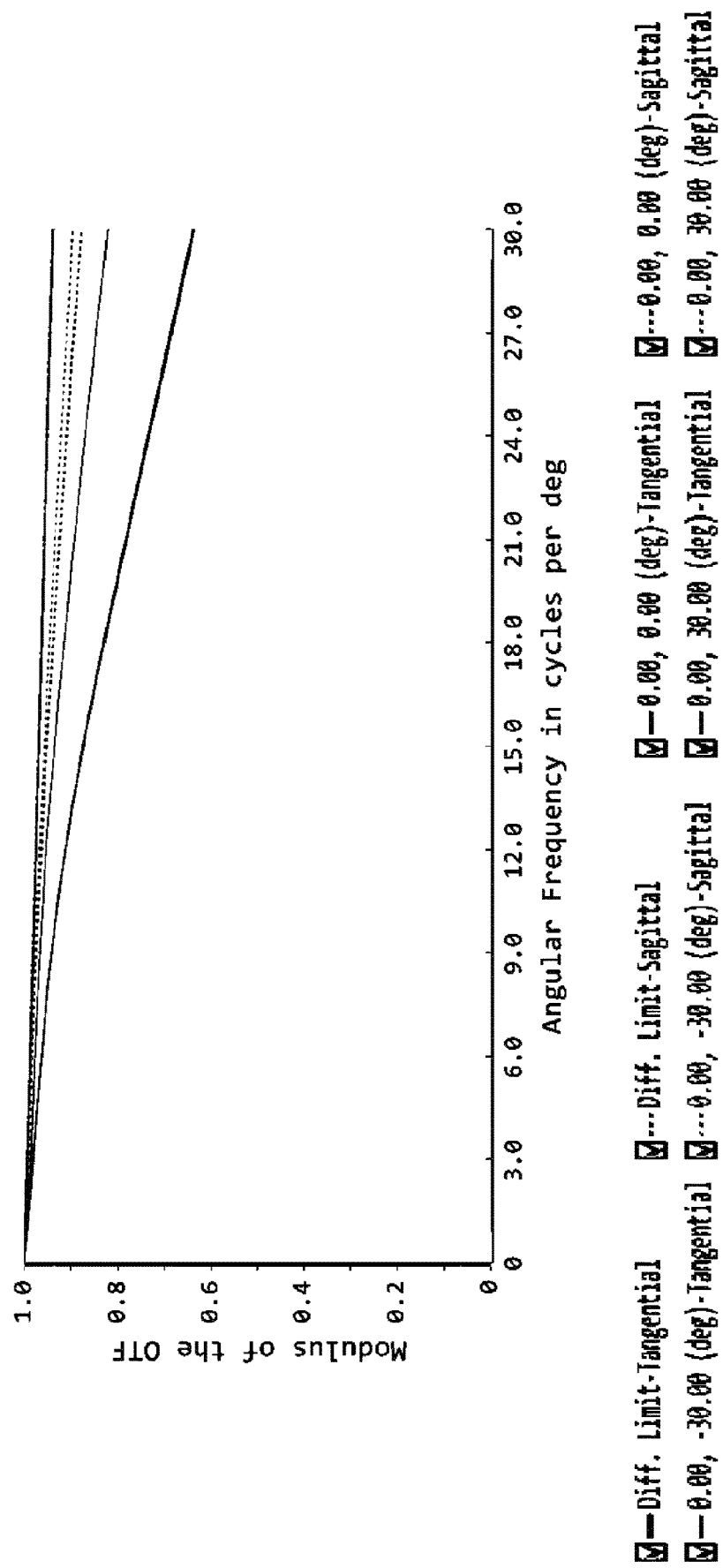
FIG. 18 shows data exemplifying an overall coma compensation optimization according to the present invention.
Figure 19:
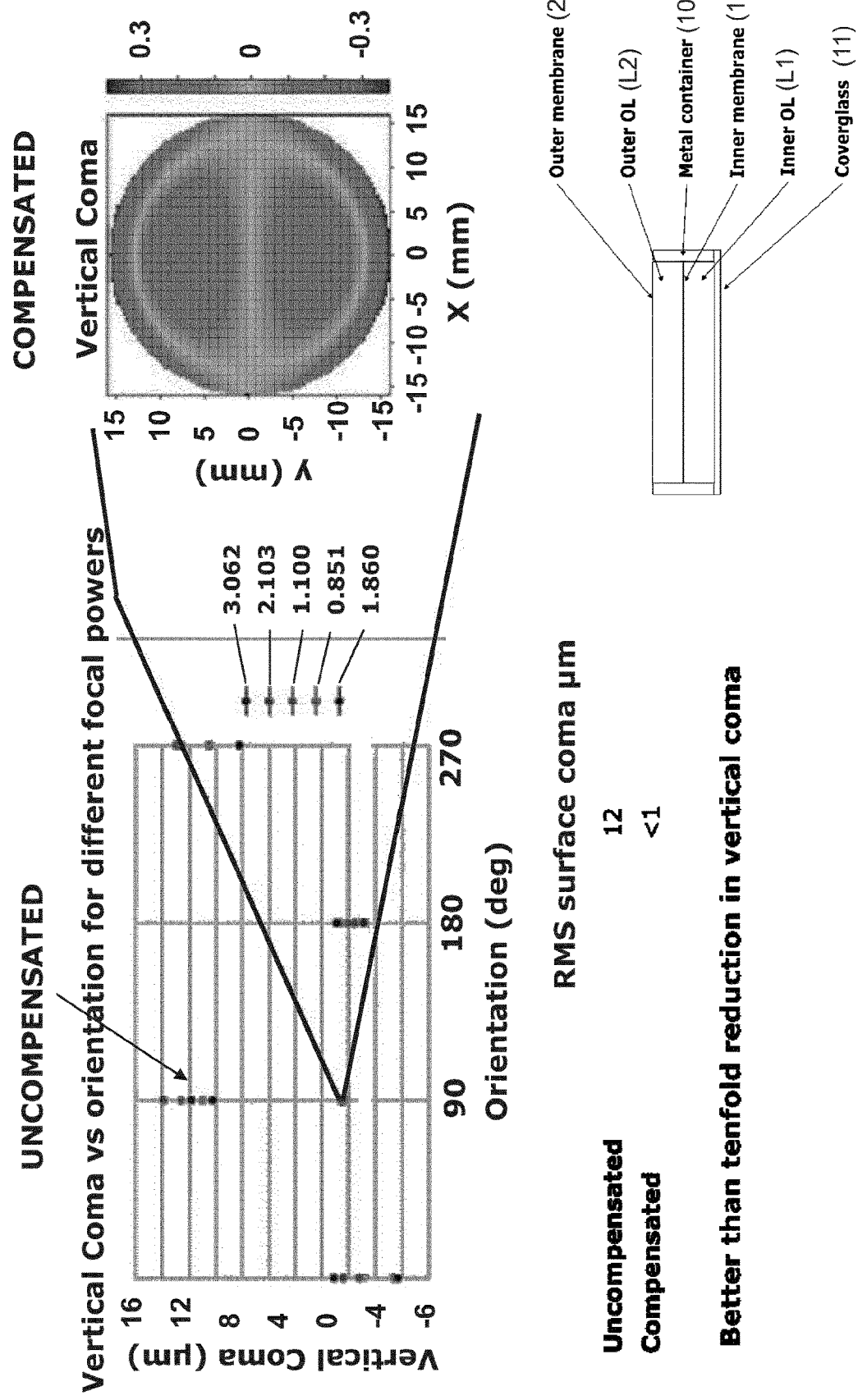
FIG. 19 shows experimental date relating to a gravity-induced coma aberration compensation of a 40 mm aperture lens.

Finally, FIGS. 17 to 19 exemplify how well the present invention works compared to usual liquid lens designs without coma aberration compensation.

Particularly, FIG. 17 shows the gravity-induced coma aberration for a liquid lens comprising two membranes 12, 22 confining two liquids L1, L2 (together with a rigid cover element 11).

Here, the outer membrane 22 comprises 2.2 µm coma using a container havening initially planar membranes. A clear degradation of the optical quality can be observed according to the graph on the right hand side showing the optical transfer function (OTF).

Furthermore, FIG. 18 shows data corresponding to a lens 1 according to the present invention, wherein here 2.2 µm coma is present on the outer membrane 22, while 10 µm coma is used on the inner membrane 12 for compensation.

As can be inferred from the graph showing the optical transfer function (OTF) only residual aberrations are visible and a much smaller degradation of the optical image quality is observed as compared to the case without compensation of the coma aberration shown in FIG. 17.

Furthermore, FIG. 19 demonstrates that using the present invention, more than a tenfold decrease of a gravity-induced coma aberration can be achieved.

Figure 20:
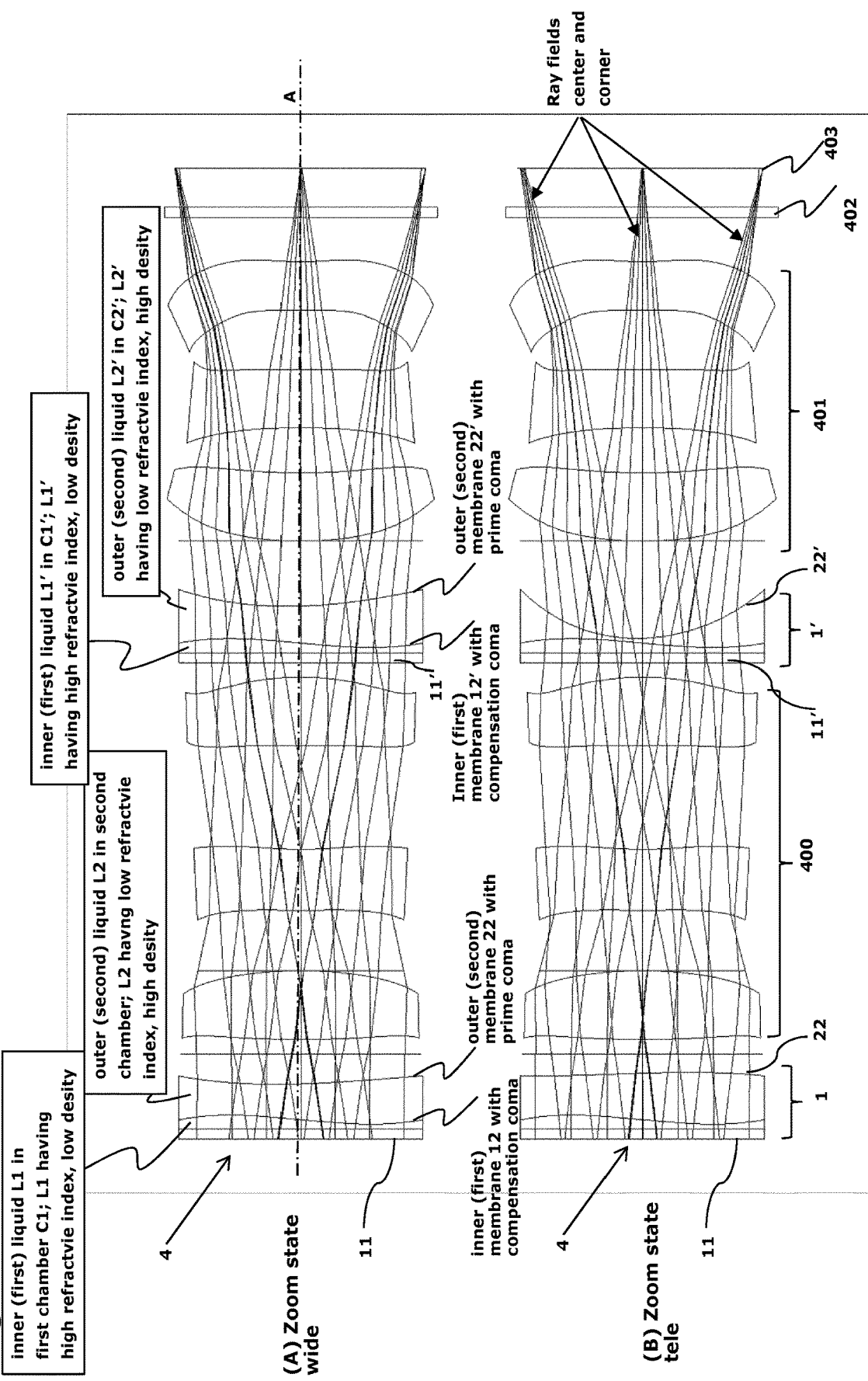
FIG. 20 shows two lenses according to the present invention as components of an optical zoom, wherein (A) shows a zoom state wide, and wherein (B) shows a zoom state tele.

Furthermore, FIG. 20 shows an optical zoom device 4 comprising a first lens 1 according to the present invention as well as a second lens 1' according to the present invention. Both lenses 1, 1' therefore reduce gravity coma.

Particularly, both lenses 1, 1' can comprises a transparent cover element 11, 11' and a first and a second membrane 12, 22; 12', 22' forming a first chamber C1, C1' filled with a first liquid L1, L1' and a second chamber C2, C2' filled with a second liquid L2, L2' as indicated in FIG. 20. In both lenses 1, 1' the first liquid L1, L1' is arranged between the cover element 11, 11' and the first membrane 12, 12' which separates the first chamber C1, C1' from the second chamber C2, C2' having the outer second membrane 22, 22'.

The two lenses 1, 1' face each other in the direction of an optical axis A of the optical zoom device 4.

The optical zoom device 4 can further comprises a first rigid lens stack 400 arranged between the first lens 1 and the second lens 1' as well as a second rigid lens stack 401 arranged between the second lens 1' and an image sensor 403. Furthermore, an IR filter 402 can be arranged in front of the image sensor 403, i.e., between the image sensor 403 and the second rigid lens stack 401.

Particularly, the outer surface of each cover element 11 of each lens 1, 1' may face away from the image sensor 403, i.e., the respective outer surface of the second membranes 22 may face towards the image sensor 403.

Particularly, FIG. 20(A) shows the optical zoom device 4 in case the lenses 1, 1' are adjusted such concerning their focal lengths that the optical zoom device 4 assumes a wide state, where the second membranes 22 comprise a concave curvature.

In contrast thereto, FIG. 20(B) shows the optical zoom device 4 in case the lenses 1, 1' are adjusted such concerning their focal lengths that the optical zoom device 4 assumes a tele state. Here, in an embodiment, the second membrane 22' of the second lens 1' comprises e.g. a pronounced concave curvature, while the second membrane 22 of the first lens 1 comprises e.g. a convex curvature.

Figure 21:
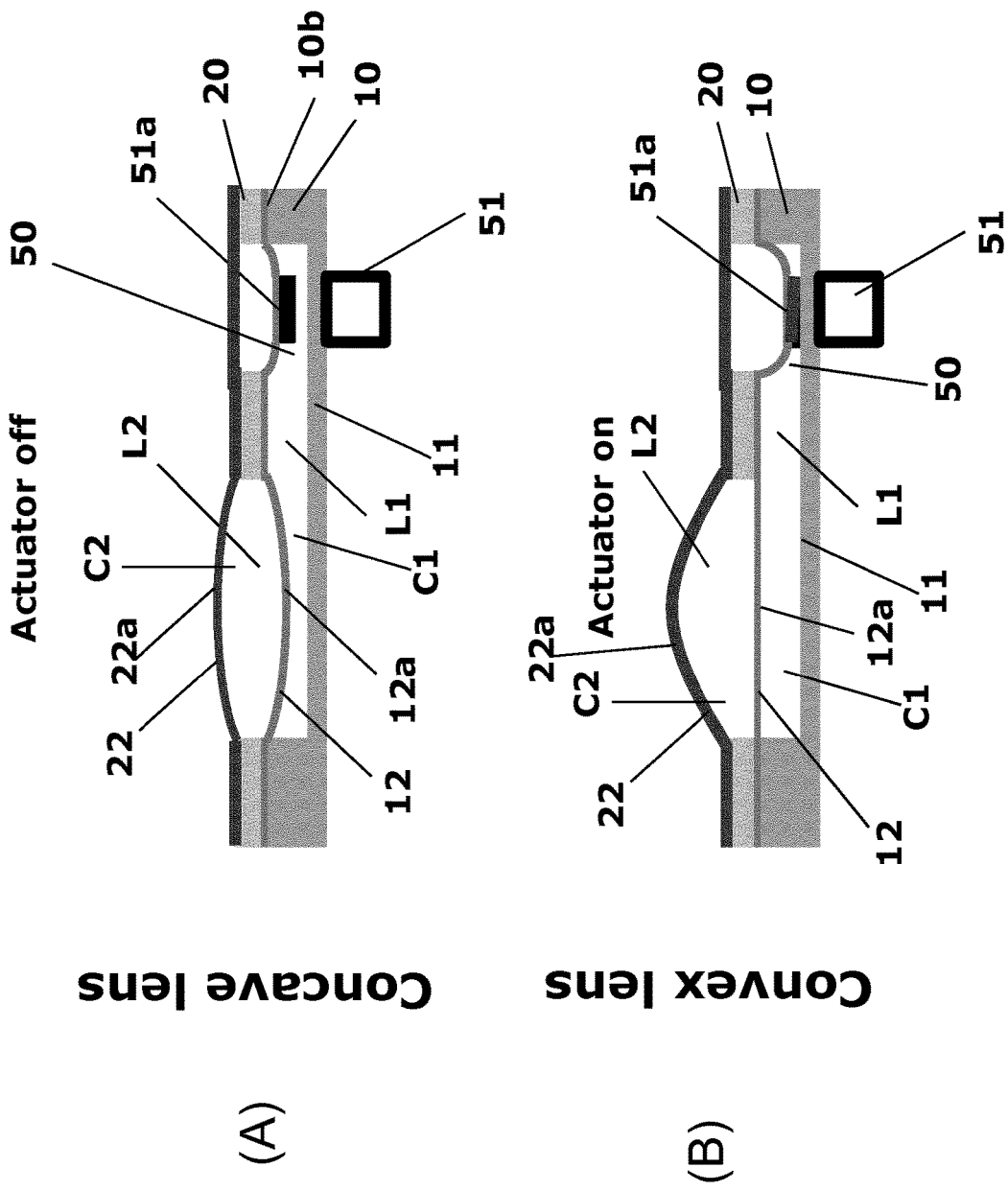
FIG. 21 shows a further embodiment of a lens according to the present invention, which corresponds to an implementation of a lens that can be tuned to form a convex lens or a concave lens including coma compensation, wherein (A) shows a state of the lens having a negative focal length, and wherein (B) shows a state of the lens having a positive focal length.

Finally, as shown in FIG. 21, the present invention does also allow to implement an embodiment of the lens 1 in form of a convex-concave lens 1 including coma compensation, i.e., a lens 1 that can be tuned from a state shown in FIG. 21(A), in which the lens 1 comprises a negative focal length, particularly when the actuator 51 is turned off, to another state (cf. FIG. 21(B)), in which the lens 1 comprises a positive focal length. According to an embodiment, this can e.g. be achieved by giving the second liquid L2 in the second chamber C2 a positive gauge pressure so that the lens 1 comprises a negative focal length when the actuator 51 is turned off (cf. FIG. 21(A)) and such that when the actuator 51 is activated the focal length is switched to a positive value (cf. FIG. 21(B)).

Particularly, similar to FIG. 3, the lens according to FIG. 21 comprises a first chamber C1 arranged between the transparent cover element 11 and the first membrane 12, wherein the first liquid L1 residing in the first chamber C1 comprises a refractive index $n_1$ that is larger than the refractive index $n_2$ of the second liquid L2 that is arranged in the second chamber C2, wherein this second chamber C2 is delimited on one side by the first membrane 12 and on the other side by the second membrane 22. Both transparent membranes 12, 22 comprise a portion 12a, 22a having a curvature that can be adjusted by pumping e.g. the first liquid L1 out of the pump reservoir 50 via a flow connection 50F into the first chamber C1 or out of the first chamber C1 into the pump reservoir 50 using the actuator 51. Particularly, pumping the first liquid L1 can be achieved by acting with a piston 51a that is moved by the actuator 51 on a portion of the first membrane 12 that covers the pump reservoir 50. Laterally, the pump reservoir 50 can be delimited by the first lateral wall 10. The latter can comprise a face side 10b that is connected to the first membrane 12 to form the first chamber C1. Furthermore, the first lateral wall 10 can be integrally formed with the cover element 11. The cover element 11 may also be a separate element (see also above). Furthermore, the first membrane 12 delimits the second chamber C2 together with the second lateral wall 20 (to which the first membrane 12 can be connected) and the second membrane 22 that is connected to the second lateral wall 20.

When the actuator 51 is now deactivated, the pressure of the second liquid L2 in the second chamber C2 is adjusted such that it corresponds to a positive gauge pressure leading to a bi-convex shape of the second chamber C2 and e.g. to a plano-concave shape of the first chamber C1. Since the latter comprises the higher refractive index liquid L1, the lens 1 assumes a negative focal length, i.e. corresponds to a concave lens 1 (cf. FIG. 21(A)). However, in case the actuator 51 is now activated, it pulls on the piston 51a and therewith pumps first liquid L1 from the pump reservoir 50 into the first chamber C1. Now, the first chamber C1 becomes flat and second liquid L2 is pushed towards the second membrane 22. As a result, the second chamber C2 now forms a convex lens portion while the first chamber C1 comprises a flat shape leading to positive focal length of the lens 1. Thus, the lens 1 now corresponds to a convex lens 1.

Particularly, the actuator 51 can be or comprise an electropermanent magnet, a voice coil magnet, or may be formed as a reluctance actuator. Other forms of actuators that can move the piston 51a in the described fashion are also conceivable.

Instead of pumping the first liquid L1 one can also consider pumping the second liquid L2 in order to influence the chambers C1, C2 to switch from a concave lens 1 to a convex lens 1 or vice versa.

Figure 22:
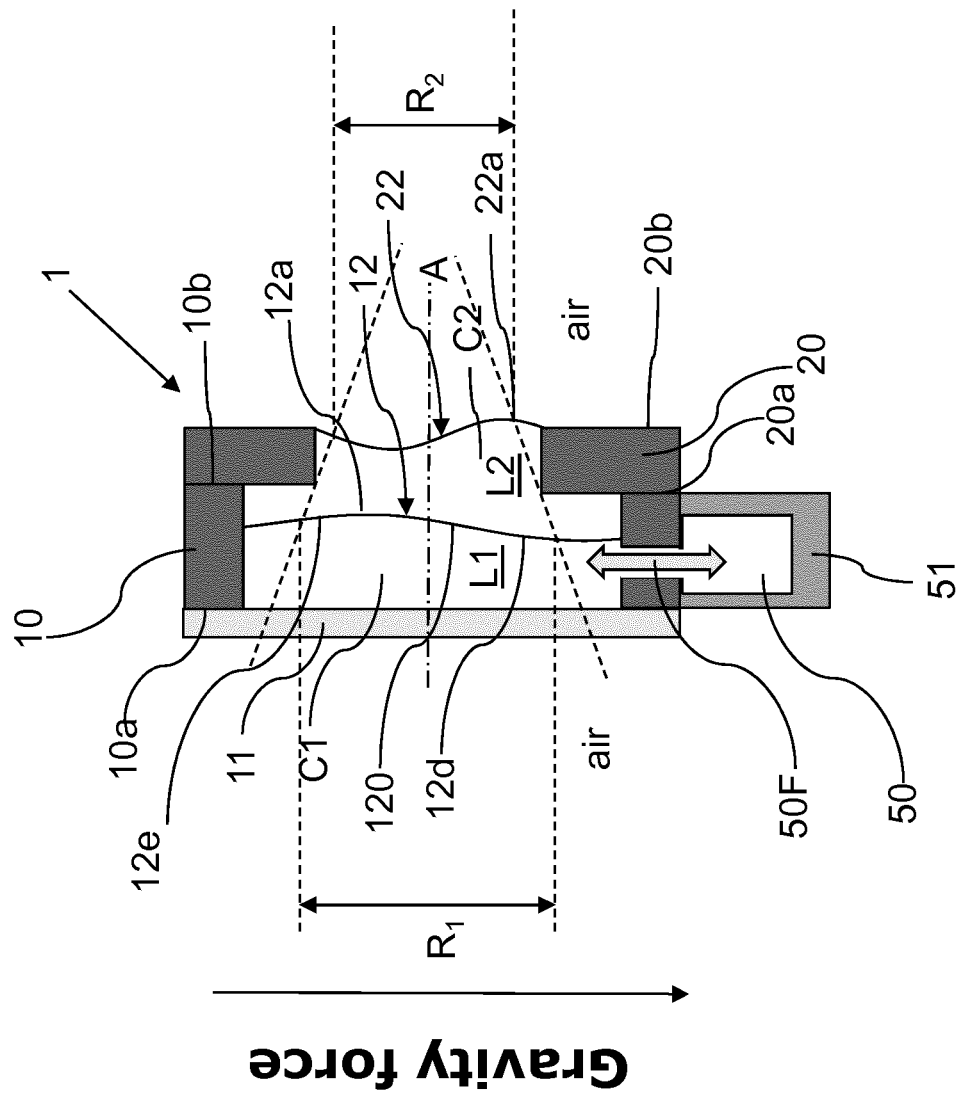
FIG. 22 shows an embodiment having membranes with aperture portions of different size.

FIG. 22 shows a similar embodiment as shown in FIGS. 3 and 4. Therefore, only the differences to FIG. 3 and FIG. 4 will be elaborated. Features that have been already elaborated in the corresponding sections of FIGS. 3 and 4 are not repeated here, but it is referred to the corresponding sections. In contrast to FIGS. 3 and 4, the embodiment shown in FIG. 22 provides for a lens 1 which has a second lateral wall 20 having a smaller circumferential edge than the circumferential edge of the first lateral wall 10, for example, the radius of an opening of the second wall 20 is smaller than the radius of an opening of the first wall 10.

This geometry defines a first aperture portion (indicated by horizontal broken line limiting a radius $R_1$) on the first membrane 12 having a radius of $R_1$ and a second aperture portion (indicated by horizontal broken lines limiting the radius $R_2$) on the second membrane 22. The aperture portions are particularly defined by an aperture angle or an angle of divergence of the incident or outgoing light propagating though the lens 1 (as indicated by the conic broken lines).

The first wall 10 acts as the first lens shaper and the second wall 20 acts as the second lens shaper.

Figure 23:
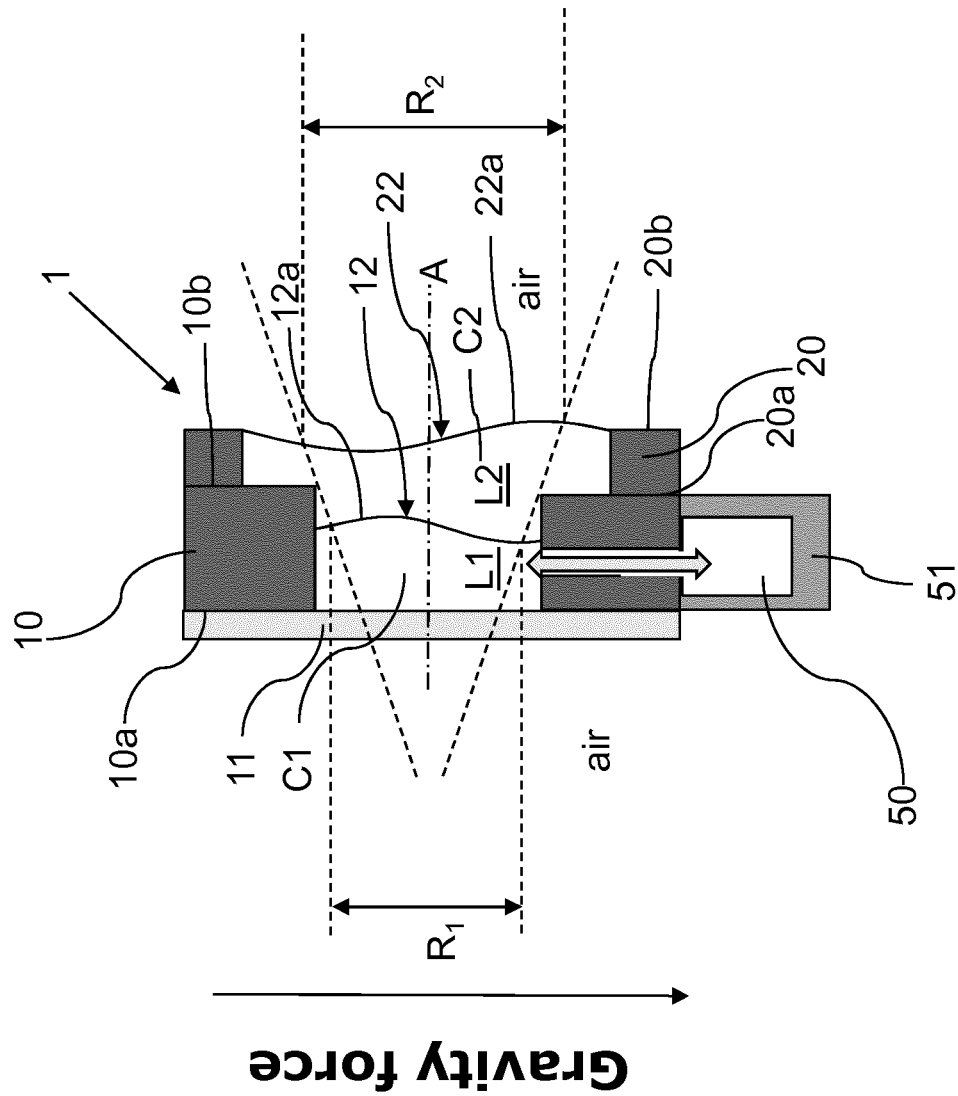
FIG. 23 shows an embodiment having membranes with aperture portions of different size.

In FIG. 23 an embodiment similar to the embodiments of FIGS. 3, 4 and 22 is shown. Therefore only new or differing features are elaborated here, while for the other features it is referred to the corresponding paragraphs of FIGS. 3, 4 and 22.

In contrast to FIG. 22, the embodiment shown in FIG. 23 provides for a lens 1 which has the second lateral wall 20 having a larger circumferential edge than the circumferential edge of the first lateral wall 10, e.g. the radius of an opening of the second wall 20 is larger than the radius of an opening of the first wall 10.

This geometry defines the first aperture portion (indicated by horizontal broken line limiting a radius $R_1$) on the first membrane 12 having a radius of $R_1$ and the second aperture portion (indicated by horizontal broken lines limiting the radius $R_2$) on the second membrane 22. The aperture portions are particularly defined by an aperture angle or an angle of divergence of the incident or outgoing light propagating though the lens (as indicated by the conic broken lines).

The first wall 10 acts as the first lens shaper and the second wall acts as the second lens shaper.

This embodiment allows for a reduced stiffness ratio as compared to the lens shown in FIG. 22 and FIG. 3, while still being capable to achieve the same coma-compensation. The stiffness of the second membrane 22 can be about 3 to 5 times (as compared to about 5 to 10 times) smaller than the stiffness of the first membrane 12, which translates in corresponding favorable membrane thickness ratios.

Figure 24:
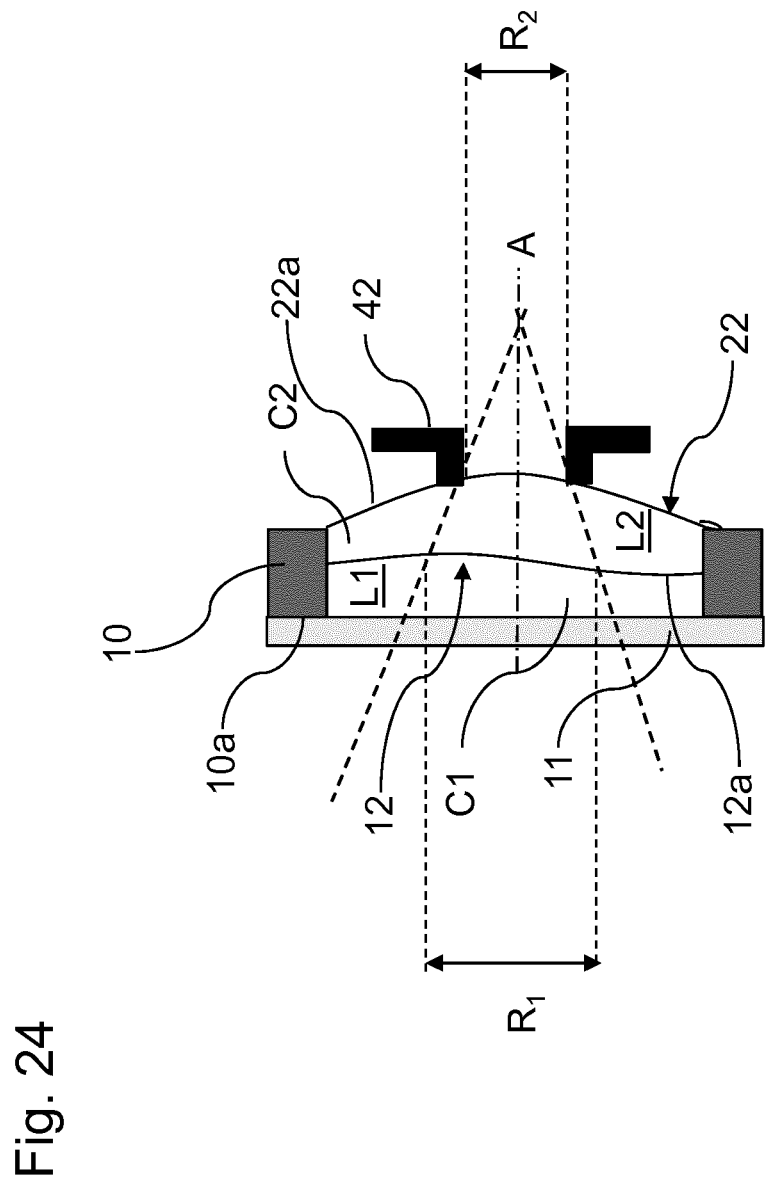
FIG. 24 shows an embodiment having an aperture element for limiting the aperture of the lens.

In FIG. 24, an embodiment similar to FIGS. 5 and 6 is shown (reference signs as shown FIGS. 5 and 6 refer to the same feature in FIG. 24). FIG. 24 shows a lens with a dedicated second aperture element 42 arranged on the second membrane 22. The second aperture element 42 defines and limits the second (and thus also the first) aperture portion and in general the optical aperture of the lens. The aperture angle (enclosed by the two conic broken lines) of divergent light entering or exiting the lens is limited by said aperture element 42.

In FIG. 25 a simulation for a non-circular but elliptic lens shaper for a conventional liquid lens is shown, wherein the elastic membrane of the liquid lens extends essentially along the x and y axis. The color coding refers to an extension of the membrane along the z-axis (optical axis). Gravity points along negative y-values. As can be seen from this figure, the liquid of the lens leads to a convex protrusion in the lower half of lens having an elevated membrane contour (positive z-values) and a concave recess in the upper half of the lens (negative z-values). With the lens according to the invention, the gravity-induced coma in non-circular lens geometries can be compensated as well.

Given a non-round tunable lens geometry having a non-circular membrane the gravity effect can be compensated with the second membrane having the same or a scaled area and an isotropically increased or decreased form of the first membrane.

Figure 26:
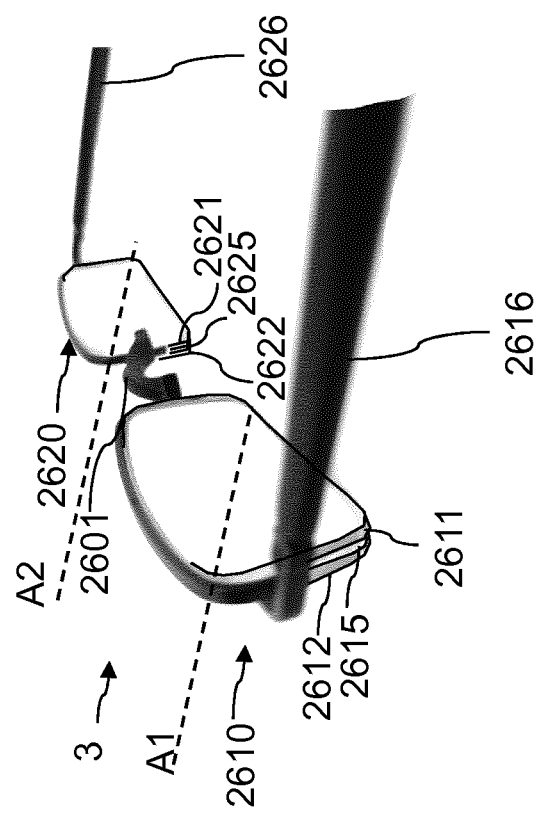
FIG. 26 shows an embodiment of the invention in form of eyeglasses.

In FIG. 26 shows an embodiment of the invention that comprises eyeglasses for augmented or virtual reality display.

The eyeglasses 3 comprise temples 2616, 2626 for wearing the eyeglasses. Also the eyeglasses comprise a nose bridge 2601 connecting a first eyeglass 2610 and a second eyeglass 2620 that are arranged in front of the eyes of a wearer of the eyeglasses 3, when worn.

The first and the second eyeglass 2610, 2620 each comprise a first lens 2611, 2621 according to the invention, and a second lens according to the invention 2612, 2622. The lenses 2611, 2621, 2612, 2622 each are configured to prevent or at least reduce acceleration-dependent aberrations that typically occur in liquid lenses.

The first and the second lenses of each eyeglass are arranged such that their optical axes A1, A2 align. The first and the second lens 2612, 2622 of each eyeglass 2610, 2620 form a stack along the optical axis A1, A2, wherein between the first lens 2611, 2621 and the second lens 2621, 2622 of each eyeglass 2610, 2620 a waveguide 2615, 2625 is arranged, wherein the waveguides 2615, 2625 and particularly the first and second lenses 2611, 2621, 2621, 2622 each are arranged and configured to display virtual content to each eye of the wearer wearing the eyeglasses 3.

The lens according to the invention can also be used and formed as a contact lens.

The invention claimed is:

1. A lens (1), comprising:
   a first chamber (C1) filled with a first transparent liquid (L1) comprising a first mass density (p1) and a first refractive index (n1),
   a second chamber (C2) filled with a second transparent liquid (L2) comprising a second mass density (p2) and a second refractive index (n2), and
   a transparent and elastically deformable first membrane (12) that separates the two chambers (C1, C2) from one another and contacts the first liquid (L1) and the second liquid (L2), wherein said mass densities (p1, p2) and said refractive indices (n1, n2) are selected such that an acceleration-dependent aberration of the lens (1) is reduced or prevented,
   wherein the lens (1) comprises a second transparent and elastically deformable membrane (22), wherein the second membrane (22) faces the first membrane (12),
   wherein the lens (1) comprises a circumferential first lateral wall (10), wherein the first lateral wall (10) comprises a first side (10a) and a second side (10b), wherein the second side (10b) faces away from the first side (10a), and wherein the lens (1) comprises a first transparent cover element (11), wherein the first cover element (11) is connected to the first side (10a) of the first lateral wall (10), and the first membrane (12) is connected to the second side (10b) of the first lateral wall (10) to form the first chamber (C1), and wherein the lens (1) comprises an annular movable lens shaper (30) and wherein the second membrane (22) is connected with a circumferential boundary (22c) region to a second side (301) of the movable lens shaper (30), such that the two membranes (12, 22) and the movable lens shaper (30) enclose the second chamber (C2), wherein the second side (301) of the movable lens shaper (30) faces away from a first side (300) of the movable lens shaper (30).

2. The lens according to claim 1, characterized in that when an optical axis (A) of the lens (1) is in a horizontal position, the first membrane (12) forms on a surface (120) facing the first liquid (L1) at least a convex section (12d) and at least a concave section (12e).

3. The lens according to claim 1, characterized in that the mass densities (p1, p2) and the refractive indices (n1, n2) are selected such that acceleration-dependent aberration of the lens (1) is reduced or prevented independent of an orientation of the optical axis (A) of the lens (1), and wherein the first mass density (p1) is smaller than the second mass density (p2), and wherein the first refractive index (n1) is larger than the second refractive index (n2).

4. The lens according to claim 1, characterized in that the first mass density is larger than the second mass density, and wherein the first refractive index is smaller than the second refractive index.

5. The lens according to claim 1, wherein a stiffness $s_1$ of the first membrane and a stiffness $s_2$ of the second membrane is given by $$\frac{s_1}{s_2} = \frac{n_2 - n_1}{n_2 - 1} \frac{p_1 - p_2}{p_2},$$

wherein $n_1$ corresponds to the first refractive index (n1), wherein $n_2$ corresponds to the second refractive index (n2), wherein $p_1$ corresponds to the first mass density (p1), wherein $p_2$ corresponds to the second mass density (p2).

6. The lens according to claim 1, characterized in that the first lateral wall (10) is elastically deformable, such that the lens (1) allows to compensate a thermal expansion of the first and/or second liquid (L1, L2).

7. The lens according to claim 1, characterized in that a stiffness of the first membrane (12), a stiffness of the second membrane (22), said mass densities (p1, p2) and said refractive indices (n1, n2) are adapted such that the acceleration-dependent aberration of the first and of the second membrane (12, 22) is compensated.

8. The lens according to claim 1, characterized in that the lens (1) forms an achromat.

9. The lens according to claim 1, characterized in that the movable lens shaper (30) comprises a first circumferential edge (31a) defining a portion (12a) of the first membrane (12) and an opposing second circumferential edge (31b) defining a portion (22a) of the second membrane (22), wherein said portion (12a) of the first membrane (12) comprises an adjustable curvature, and wherein said portion (22a) of the second membrane (22) comprises an adjustable curvature.

10. Eyeglasses (3), comprising two lenses, each of the two lenses being a lens according to claim 1, namely a first lens (2611, 2621) and a second lens (2612, 2622), wherein the second lens (2612, 2622) is arranged in front of the first lens (2611, 2621), and wherein a waveguide (2615, 2625) is arranged between the first lens (2611, 2621) and the second lens (2612, 2622).

11. The eyeglasses (3) according to claim 10, wherein the eyeglasses are augmented reality eyeglasses.

12. The lens (1) according to claim 1, wherein the first membrane (12) and the second membrane (22) are non-circular, wherein adjustable portions of the first and/or second membrane are non-circular.

13. The lens according to claim 1, wherein said mass densities (p1, p2) and said refractive indices (n1, n2) are selected such that a gravity-induced aberration of the lens and/or a gravity-induced coma aberration of the lens is reduced or prevented.

14. The lens according to claim 1, wherein the first cover element (11) is a plano-concave cover element (11) comprising a concave surface (11b) that faces towards the first membrane (12).

15. The lens according to claim 1, wherein the annular movable lens shaper is connected to the first membrane with the first side of the movable lens shaper.

16. A lens (1), comprising:
- a first chamber (C1) filled with a first transparent liquid (L1) comprising a first mass density (p1) and a first refractive index (n1),
- a second chamber (C2) filled with a second transparent liquid (L2) comprising a second mass density (p2) and a second refractive index (n2), and
- a transparent and elastically deformable first membrane (12) that separates the two chambers (C1, C2) from one another and contacts the first liquid (L1) and the second liquid (L2), wherein said mass densities (p1, p2) and said refractive indices (n1, n2) are selected such that an acceleration-dependent aberration of the lens (1) is reduced or prevented, wherein the lens (1) comprises a second transparent and elastically deformable membrane (22), wherein the second membrane (22) faces the first membrane (12), wherein the lens (1) comprises a circumferential first lateral wall (10), wherein the first lateral wall (10) comprises a first side (10a) and a second side (10b), wherein the second side (10b) faces away from the first side (10a), and wherein the lens (1) comprises a first transparent cover element (11), wherein the first cover element (11) is connected to the first side (10a) of the first lateral wall (10), and the first membrane (12) is connected to the second side (10b) of the first lateral wall (10) to form the first chamber (C1), and wherein the lens (1) comprises a second lateral wall (20), wherein the second lateral wall (20) comprises a first side (20a) and a second side (20b), wherein the second side (20b) of the second lateral wall (20) faces away from the first side (20a) of the second lateral wall (20), and wherein the first side (20a) of the second lateral wall (20) is connected to the first membrane (12), and the second side (20b) of the second lateral wall (20) is connected to the second membrane (22) to form the second chamber (C2), wherein a stiffness $s_1$ of the first membrane and a stiffness $s_2$ of the second membrane is given by $$\frac{s_1}{s_2} = \frac{n_2 - n_1}{n_2 - 1} \frac{p_1 - p_2}{p_2},$$

wherein $n_1$ corresponds to the first refractive index (n1), wherein $n_2$ corresponds to the second refractive index (n2), wherein $p_1$ corresponds to the first mass density (p1), wherein $p_2$ corresponds to the second mass density (p2).

17. The lens according to claim 16, wherein when an optical axis (A) of the lens (1) is in a horizontal position, the first membrane (12) forms on a surface (120) facing the first liquid (L1) at least a convex section (12d) and at least a concave section (12e).

18. The lens according to claim 16, characterized in that the mass densities (p1, p2) and the refractive indices (n1, n2) are selected such that acceleration-dependent aberration of the lens (1) is reduced or prevented independent of an orientation of the optical axis (A) of the lens (1), and wherein the first mass density (p1) is smaller than the second mass density (p2), and wherein the first refractive index (n1) is larger than the second refractive index (n2).

19. The lens according to claim 16, characterized in that the first mass density is larger than the second mass density, and wherein the first refractive index is smaller than the second refractive index.

20. The lens according to claim 16, characterized in that the first lateral wall (10) is elastically deformable, such that the lens (1) allows to compensate a thermal expansion of the first and/or second liquid (L1, L2).

21. The lens according to claim 16, characterized in that a stiffness of the first membrane (12), a stiffness of the second membrane (22), said mass densities (p1, p2) and said refractive indices (n1, n2) are adapted such that the acceleration-dependent aberration of the first and of the second membrane (12, 22) is compensated.

22. The lens according to claim 16, characterized in that the lens (1) forms an achromat.

23. The lens (1) according to claim 16, wherein the first membrane (12) and the second membrane (22) are non-circular, wherein adjustable portions of the first and/or second membrane are non-circular.

24. The lens according to claim 16, wherein said mass densities (p1, p2) and said refractive indices (n1, n2) are selected such that a gravity-induced aberration of the lens and/or a gravity-induced coma aberration of the lens is reduced or prevented.

25. The lens according to claim 16, wherein the first cover element (11) is a plano-concave cover element (11) comprising a concave surface (11*b*) that faces towards the first membrane (12).

26. Eyeglasses (3), comprising two lenses according to claim 16, namely a first lens (2611, 2621) and a second lens (2612, 2622), wherein the second lens (2612, 2622) is arranged in front of the first lens (2611, 2621), and wherein a waveguide (2615, 2625) is arranged between the first lens (2611, 2621) and the second lens (2612, 2622).

27. A lens (1), comprising:
a first chamber (C1) filled with a first transparent liquid (L1) comprising a first mass density (p1) and a first refractive index (n1),
a second chamber (C2) filled with a second transparent liquid (L2) comprising a second mass density (p2) and a second refractive index (n2), and
a transparent and elastically deformable first membrane (12) that separates the two chambers (C1, C2) from one another and contacts the first liquid (L1) and the second liquid (L2), wherein said mass densities (p1, p2) and said refractive indices (n1, n2) are selected such that an acceleration-dependent aberration of the lens (1) is reduced or prevented, wherein the lens (1) comprises a second transparent and elastically deformable membrane (22), wherein the second membrane (22) faces the first membrane (12), wherein a stiffness $s_1$ of the first membrane and a stiffness $s_2$ of the second membrane is given by $$\frac{s_1}{s_2} = \frac{n_2 - n_1}{n_2 - 1} \frac{p_1 - p_2}{p_2},$$

wherein $n_1$ corresponds to the first refractive index (n1), wherein $n_2$ corresponds to the second refractive index (n2), wherein $p_1$ corresponds to the first mass density (p1), wherein $p_2$ corresponds to the second mass density (p2).

28. Eyeglasses (3), comprising two lenses according to claim 27, namely a first lens (2611, 2621) and a second lens (2612, 2622), wherein the second lens (2612, 2622) is arranged in front of the first lens (2611, 2621), and wherein a waveguide (2615, 2625) is arranged between the first lens (2611, 2621) and the second lens (2612, 2622).

\* \* \* \* \*